US012649216B2

(12) United States Patent
Aoyama et al.

(10) Patent No.: US 12,649,216 B2
(45) Date of Patent: Jun. 9, 2026

(54) IMPACT TOOL

(71) Applicant: MAKITA CORPORATION, Anjo (JP)

(72) Inventors: Tomoro Aoyama, Anjo (JP); Yuya Okada, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/006,415

(22) Filed: Dec. 31, 2024

(65) Prior Publication Data

US 2025/0235989 A1 Jul. 24, 2025

(30) Foreign Application Priority Data

Jan. 23, 2024 (JP) ................................. 2024-007842

(51) Int. Cl.

*B25B 21/02* (2006.01)
*B25B 23/18* (2006.01)
*B25F 5/02* (2006.01)

(52) U.S. Cl.

CPC .............. *B25B 21/02* (2013.01); *B25B 23/18* (2013.01); *B25F 5/02* (2013.01)

(58) Field of Classification Search

CPC ......... B25B 21/02; B25B 23/18; B25B 23/16; B25F 5/02; B25D 11/064; B25D 11/06; B25D 17/245; B25D 17/24
USPC ................ 173/114, 117, 202, 212, 128, 1, 2
See application file for complete search history.

(56) References Cited

U.S. PATENT DOCUMENTS 4,936,171 A * 6/1990 Berg ........................ B25B 23/18 362/120
5,119,634 A * 6/1992 Berry ....................... B25C 1/143 60/632
5,180,019 A * 1/1993 Thiry ...................... B25D 17/00 173/171
5,525,842 A * 6/1996 Leininger ............ H02K 1/2713 290/43
5,584,565 A * 12/1996 Berg ........................ B25B 23/18 362/120
5,657,919 A * 8/1997 Berry ....................... B25C 1/143 173/DIG. 2
D396,789 S * 8/1998 Murray ............................ D8/68
(Continued)

FOREIGN PATENT DOCUMENTS

JP 2021-112816 A 8/2021

*Primary Examiner* — Dariush Seif
(74) *Attorney, Agent, or Firm* — Oliff PLC

(57) ABSTRACT

An impact tool includes: a motor; a motor housing portion that houses the motor; a grip portion extending downward from the motor housing portion; a hammer rotated by the motor; an anvil that is impacted by the hammer in a rotation direction; a hammer housing portion that houses the hammer; a prop portion arranged on a front side of the grip portion and extending below the motor housing portion or the hammer housing portion; a battery holding portion which is connected to the grip portion and the prop portion and to which a battery pack is detachably attached; and a light emitter unit that is held at a front portion of the hammer housing portion and includes a plurality of light emitters arranged in the rotation direction around the anvil. A lead wire electrically connected to the light emitter unit passes through an inside of the prop portion.

18 Claims, 20 Drawing Sheets

(56) References Cited

U.S. PATENT DOCUMENTS

| | | | | |
|---|---|---|---|---|
| 6,170,579 | B1 * | 1/2001 | Wadge | B25F 3/00 173/217 |
| 6,286,611 | B1 * | 9/2001 | Bone | B25F 3/00 173/217 |
| 6,446,734 | B1 * | 9/2002 | Williams | B25F 5/02 173/217 |
| D571,176 | S * | 6/2008 | Albinsson | D8/69 |
| D600,087 | S * | 9/2009 | DiPasquale | D8/69 |
| 7,726,863 | B2 * | 6/2010 | Brandstaetter | A61B 1/0676 362/399 |
| 8,371,848 | B2 * | 2/2013 | Okawa | A61B 1/24 433/29 |
| 8,496,366 | B2 * | 7/2013 | Leong | B25B 21/02 362/446 |
| 8,827,483 | B2 * | 9/2014 | Dixon | B25F 5/021 362/109 |
| 9,028,088 | B2 * | 5/2015 | Vanko | B25F 5/00 362/120 |
| 9,352,458 | B2 * | 5/2016 | Friedman | B25B 21/00 |
| 9,774,273 | B2 * | 9/2017 | Suzuki | H02J 7/00 |
| 10,525,582 | B2 * | 1/2020 | Qiu | B23D 59/002 |
| 10,850,383 | B1 * | 12/2020 | Urban | B25F 5/00 |
| 11,280,488 | B2 * | 3/2022 | Niwa | F21V 13/045 |
| 11,453,106 | B2 * | 9/2022 | Kelly | B25F 5/021 |
| 12,194,602 | B2 * | 1/2025 | Ogiso | B25B 23/18 |
| 2002/0050366 | A1 * | 5/2002 | Driessen | B25F 3/00 173/217 |
| 2004/0174699 | A1 * | 9/2004 | Minalga | B25B 23/18 362/119 |
| 2005/0157489 | A1 * | 7/2005 | Oomori | B25B 23/18 362/119 |
| 2005/0271489 | A1 * | 12/2005 | Gensmann | B25D 17/06 409/231 |
| 2006/0092674 | A1 * | 5/2006 | Belton | B23D 21/04 363/32 |
| 2009/0126964 | A1 * | 5/2009 | Schroeder | H02K 11/28 173/171 |
| 2009/0256319 | A1 * | 10/2009 | Seymour | B25F 5/021 279/142 |
| 2010/0149790 | A1 * | 6/2010 | Leong | B25F 5/021 362/119 |
| 2010/0214768 | A1 * | 8/2010 | Dixon | B25F 5/021 362/119 |
| 2010/0224033 | A1 * | 9/2010 | Yeoh | B25B 21/02 173/217 |
| 2011/0180286 | A1 * | 7/2011 | Oomori | H02K 9/06 173/217 |
| 2011/0187211 | A1 * | 8/2011 | Matsunaga | H02K 7/145 310/50 |
| 2011/0188232 | A1 * | 8/2011 | Friedman | F21S 9/04 362/119 |
| 2012/0224381 | A1 * | 9/2012 | Hashimoto | F21V 29/15 362/382 |
| 2013/0021783 | A1 * | 1/2013 | Vanko | B25B 21/00 362/119 |
| 2013/0058711 | A1 * | 3/2013 | Van Der Linde | B25F 5/02 403/349 |
| 2013/0118767 | A1 * | 5/2013 | Cannaliato | B25F 3/00 173/29 |
| 2013/0155668 | A1 * | 6/2013 | Rennecker | F21V 33/008 362/191 |
| 2013/0286635 | A1 * | 10/2013 | Dixon | F21V 33/0084 362/119 |
| 2013/0300331 | A1 * | 11/2013 | Nishii | H02P 29/68 318/471 |
| 2014/0008088 | A1 * | 1/2014 | Chellew | B25F 5/021 362/559 |
| 2014/0036482 | A1 * | 2/2014 | Vanko | F21V 33/0084 362/119 |
| 2014/0144663 | A1 * | 5/2014 | Fuchs | B25F 5/02 173/217 |
| 2014/0182869 | A1 * | 7/2014 | Kumagai | B25F 5/001 173/93 |
| 2015/0041166 | A1 * | 2/2015 | Van Der Linde | B25F 3/00 173/29 |
| 2015/0042246 | A1 * | 2/2015 | Tadokoro | H02P 6/34 318/114 |
| 2015/0069864 | A1 * | 3/2015 | Nagahama | H02K 5/225 310/50 |
| 2015/0239114 | A1 * | 8/2015 | Schaub | B25D 11/068 29/446 |
| 2016/0311102 | A1 * | 10/2016 | Ebner | H01M 50/247 |
| 2016/0354889 | A1 * | 12/2016 | Ely | B23Q 17/2404 |
| 2017/0173768 | A1 * | 6/2017 | Dey, IV | B25B 21/02 |
| 2017/0302044 | A1 * | 10/2017 | Lefavour | B23P 11/005 |
| 2018/0065232 | A1 * | 3/2018 | Mueckl | B25B 21/00 |
| 2018/0085901 | A1 * | 3/2018 | Leininger | B25B 23/18 |
| 2018/0126538 | A1 * | 5/2018 | Qiu | G02B 6/0021 |
| 2018/0161951 | A1 * | 6/2018 | Billings | F21V 23/0471 |
| 2018/0222022 | A1 * | 8/2018 | Kumagai | B25D 11/104 |
| 2019/0091824 | A1 * | 3/2019 | Chellew | F21V 23/0457 |
| 2020/0180128 | A1 * | 6/2020 | Schneider | B25D 11/068 |
| 2021/0028671 | A1 * | 1/2021 | Chung | H02K 11/33 |
| 2021/0060755 | A1 * | 3/2021 | Kawai | B25F 5/00 |
| 2021/0094158 | A1 * | 4/2021 | Kato | B25B 23/147 |
| 2021/0122017 | A1 * | 4/2021 | Kelly | H05B 47/16 |
| 2021/0222866 | A1 * | 7/2021 | Niwa | F21V 33/008 |
| 2021/0379743 | A1 * | 12/2021 | Schneider | G01D 5/204 |
| 2021/0397155 | A1 * | 12/2021 | White | G05B 19/4065 |
| 2022/0009064 | A1 * | 1/2022 | Puzio | F21S 9/04 |
| 2022/0040829 | A1 * | 2/2022 | Schneider | B25F 5/02 |
| 2022/0190687 | A1 * | 6/2022 | Fukuoka | B25B 23/18 |
| 2022/0193846 | A1 * | 6/2022 | Okazaki | B23Q 17/00 |
| 2022/0193878 | A1 * | 6/2022 | Tomayko | B25B 21/02 |
| 2022/0203512 | A1 * | 6/2022 | Kondo | H02K 9/06 |
| 2022/0314384 | A1 * | 10/2022 | Marsh | B01D 46/68 |
| 2022/0388134 | A1 * | 12/2022 | Hozumi | F21V 19/003 |
| 2023/0121902 | A1 * | 4/2023 | Nakashima | B25F 5/026 173/162.1 |
| 2023/0147598 | A1 * | 5/2023 | Tamura | B25F 5/02 81/54 |
| 2023/0182269 | A1 * | 6/2023 | Hirabayashi | B25B 23/18 173/117 |
| 2023/0182270 | A1 * | 6/2023 | Hirabayashi | B25B 23/18 173/93.5 |
| 2023/0256580 | A1 * | 8/2023 | Yang | B25F 5/02 173/93 |
| 2023/0405861 | A1 * | 12/2023 | Niiyama | B25F 5/02 |
| 2023/0415327 | A1 * | 12/2023 | Marsh | B25F 5/026 |
| 2024/0128834 | A1 * | 4/2024 | Nagahama | H02K 11/215 |
| 2024/0238948 | A1 * | 7/2024 | Suzuki | B25B 21/02 |
| 2024/0238950 | A1 * | 7/2024 | Suzuki | B25F 5/006 |
| 2024/0308034 | A1 * | 9/2024 | Kamiya | B25B 21/026 |
| 2024/0308035 | A1 * | 9/2024 | Nick | B25F 5/021 |
| 2024/0308052 | A1 * | 9/2024 | Bowers | B24B 23/005 |
| 2024/0351175 | A1 * | 10/2024 | Friedman | H01R 39/64 |
| 2024/0391085 | A1 * | 11/2024 | Kugler | B25H 1/0092 |
| 2025/0235989 | A1 * | 7/2025 | Aoyama | B25F 5/02 |

* cited by examiner

IMPACT TOOL

CROSS-REFERENCE TO RELATED APPLICATION(S)

The present application claims priority to and incorporates by reference the entire contents of Japanese Patent Application No. 2024-007842 filed in Japan on Jan. 23, 2024.

TECHNICAL FIELD

A techniques disclosed in the present specification relates to an impact tool.

BACKGROUND ART

An impact tool having a prop portion has been provided with only one light. Since such an impact tool is large in size, the light has not been able to properly illuminate a periphery of an anvil. An impact tool having a prop portion and having a side handle has been provided with only a single light. Since such an impact tool is large in size, the light has not been able to properly illuminate a periphery of an anvil. In addition, although there has been an impact tool having a side handle and having a plurality of lights, balance of the impact tool has been poor since the handle is disposed rearward of a motor.

A known impact tool is disclosed in Japanese Laid-Open Patent Publication No. 2021-112816.

SUMMARY

It is one non-limiting object of the present teachings to disclose techniques for appropriately illuminating a periphery of an anvil in an impact tool having a prop portion. In addition, it is one non-limiting object of the present teachings to disclose techniques for securing good balance in an impact tool having a side handle.

In one aspect of the present teachings, an impact tool includes: a motor; a motor housing portion that houses the motor; a grip portion extending downward from the motor housing portion; a hammer rotated by the motor; an anvil that is impacted by the hammer in a rotation direction; a hammer housing portion that houses the hammer; a prop portion arranged on a front side of the grip portion and extending below the motor housing portion or the hammer housing portion; a battery holding portion which is connected to the grip portion and the prop portion and to which a battery pack is detachably attached; and a light emitter unit that is held at a front portion of the hammer housing portion and includes a plurality of light emitters arranged in the rotation direction around the anvil. A lead wire electrically connected to the light emitter unit passes through an inside of the prop portion.

DETAILED DESCRIPTION

Figure 1:
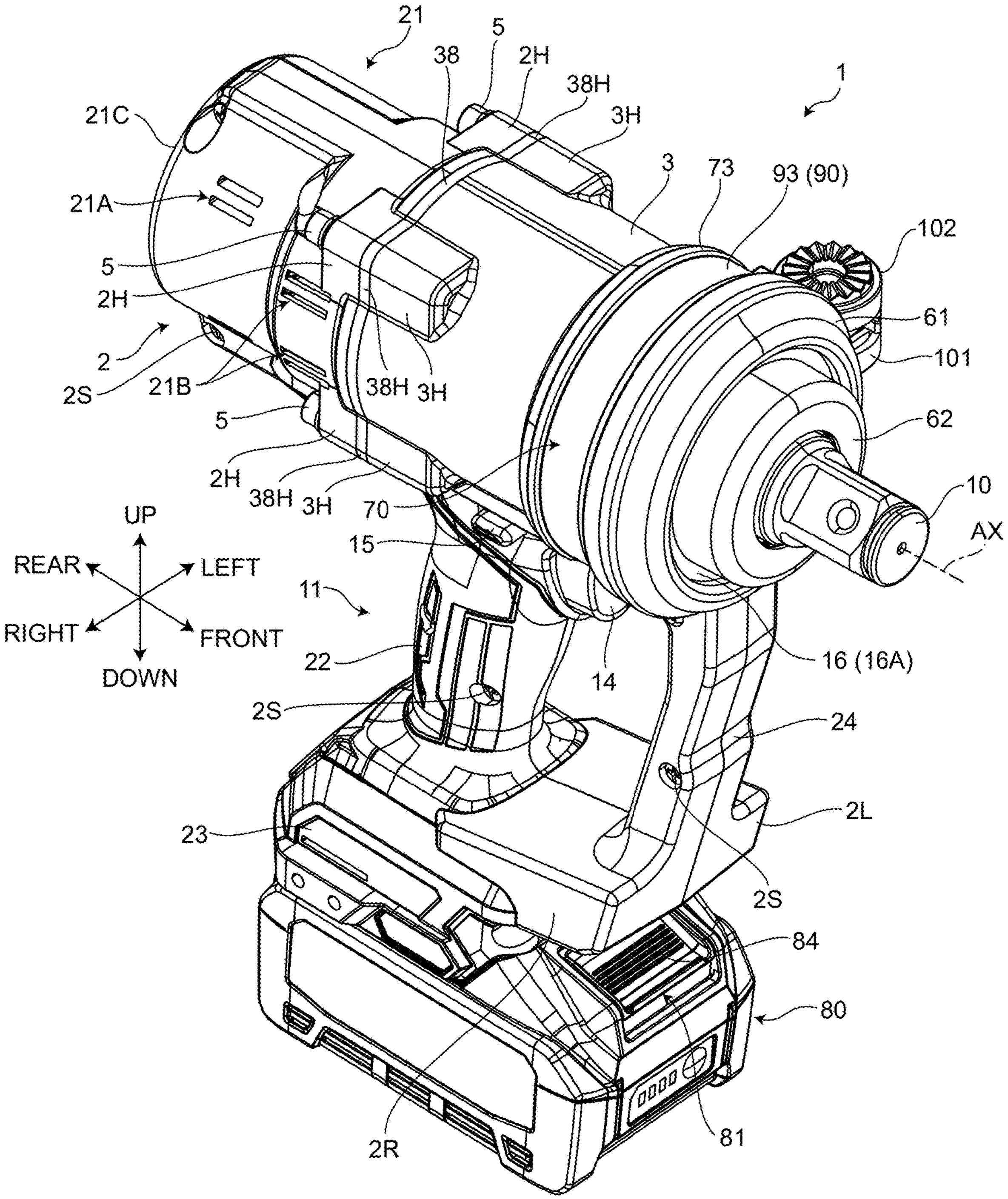
FIG. 1 is a front perspective view illustrating an impact tool according to an embodiment.

In one or more embodiments, an impact tool may include a motor, a motor housing portion that houses the motor, a grip portion that extends downward from the motor housing portion, a hammer that is rotated by the motor, an anvil that is impacted by the hammer in a rotation direction, a hammer housing portion that houses the hammer, a prop portion that is arranged on a front side of the grip portion and extends below the motor housing portion or the hammer housing portion, a battery holding portion which is connected to the grip portion and the prop portion and to which a battery pack is detachably attached, and a light emitter unit that is held at a front portion of the hammer housing portion and has a plurality of light emitters arranged in the rotation direction around the anvil. A lead wire electrically connected to the light emitter unit may pass through an inside of the prop portion.

In the above configuration, in the impact tool having the prop portion, the light emitter unit having the plurality of light emitters arranged in the rotation direction around the anvil is held at the front portion of the hammer housing portion. Thus, it is possible to appropriately illuminate the periphery of the anvil. Furthermore, since the prop portion is used as a path of the lead wire, it is not necessary to increase a size of a structure of the impact tool in order to allow the lead wire to pass. Thus, an increase in size of the impact tool due to wiring for illumination is prevented.

In the one or more embodiments, the hammer housing portion may have a front surface portion provided with the light emitter unit. The prop portion may be provided to extend downward from the front surface portion of the hammer housing portion.

In the above configuration, the light emitter unit and the prop portion can be brought close to each other. Since a portion to guide the lead wire is made small or the portion to guide the lead wire does not need to be provided between the light emitter unit and the prop portion, it is possible to prevent an increase in size of the impact tool due to the wiring for illumination. In addition, even in a case where a hammer housing portion becomes large in a large impact tool, impact resistance can be effectively improved by an arrangement of a prop portion below a front surface portion of the hammer housing portion.

In the one or more embodiments, the hammer housing portion may have a wall portion surrounding an outer periphery of the light emitter unit.

In the above configuration, the light emitter unit can be protected by the wall portion from external collision.

In the one or more embodiments, the wall portion may extend to the same position as a front surface of the light emitter unit or ahead of the front surface of the light emitter unit.

In the above configuration, since the light emitter unit does not protrude ahead of the wall portion, the light emitter unit can be effectively protected.

In the one or more embodiments, the light emitter unit may be formed in a circumferential shape to surround the anvil. The circumferential shape means to extend in a circumferential direction, and is not limited to a case of entirely surrounding the anvil, and may partially surround the anvil.

In the above configuration, light can be emitted from a wide range around the anvil by the light emitter unit. It is possible to effectively illuminate a tip tool mounted on the anvil and a working position.

In the one or more embodiments, the hammer housing portion may have a front tubular portion in which an anvil bearing that supports the anvil in the rotation direction is arranged. At least a part of the light emitter unit may be arranged between an outer peripheral surface of the hammer housing portion and the front tubular portion.

In the above configuration, a space between the outer peripheral surface of the hammer housing portion and the front tubular portion can be used as an installation space of the light emitter unit. Thus, an increase in size of the impact tool is prevented.

In the one or more embodiments, the prop portion may be arranged directly below the light emitter unit. The light emitter unit may have a protrusion portion that enters the inside of the prop portion.

In the above configuration, since the protrusion portion of the light emitter unit is arranged inside the prop portion, the lead wire extending from the light emitter unit can directly enter the inside of the prop portion. Since it is not necessary to separately provide a member that performs guiding between the light emitter unit and the prop portion, an increase in size of the impact tool is prevented.

In the one or more embodiments, the battery holding portion may have a controller that controls the light emitter unit. The lead wire may pass from an upper end portion to a lower end portion of the prop portion and be connected to the controller.

In the above configuration, even in a case where the light emitter unit is arranged in the hammer housing portion, a structure for the wiring can be simplified and the number of parts can be reduced by utilization of the entire prop portion as the path of the lead wire.

In the one or more embodiments, the light emitter unit may include an optical member that is arranged to cover a front side of the plurality of light emitters and that diffuses light emitted from the plurality of light emitters. The optical member may be continuous across the plurality of light emitters.

In the above configuration, the light emitter unit can be made to emit light not in a dotted shape but in a planar shape by the optical member. Since a variation in brightness in a light emission direction is reduced, illumination around the anvil can be more appropriately performed.

In one or more embodiments, the impact tool may further include a connection portion that connects an upper end of the grip portion and an upper end of the prop portion. The grip portion, the prop portion, the battery holding portion, and the connection portion constitute an annular handle portion.

In the above configuration, since the grip portion, the prop portion, the battery holding portion, and the connection portion are mutually supported by the annular handle portion, the impact resistance of the handle portion can be effectively improved.

In the one or more embodiments, the impact tool may include a motor, a motor housing portion that houses the motor, a grip portion that extends downward from the motor housing portion, a hammer that is rotated by the motor, an anvil that is impacted by the hammer in a rotation direction, a hammer housing portion that houses the hammer, a prop portion that is arranged on a front side of the grip portion and extends below the motor housing portion or the hammer housing portion, a battery holding portion which is connected to the grip portion and the prop portion and to which the battery pack can be detachably attached, a side handle that can be detachably attached to the hammer housing portion, and a light emitter unit arranged on the front side of the side handle.

In the above configuration, since the side handle is detachably attached to the hammer housing portion that houses the hammer, the side handle can be brought close to heavy parts (hammer and hammer housing portion). Thus, good balance can be secured in the impact tool having the side handle. Since the light emitter unit is arranged on the front side of the side handle, even in a case where the side handle is mounted on the hammer housing portion, light from the light emitter unit can be delivered to the periphery of the anvil without being blocked by the side handle. Thus, it is possible to appropriately illuminate the periphery of the anvil.

In the one or more embodiments, the hammer housing portion may have an annular and recessed installation portion that houses the light emitter unit.

In the above configuration, the annular light emitter unit can be compactly installed in the hammer housing portion. Thus, an increase in size of the impact tool can be prevented.

In the one or more embodiments, the impact tool may further include a buffer member arranged between the hammer housing portion and the light emitter unit. The buffer member may cover a rear surface of the light emitter unit and at least one of an inner peripheral surface or an outer peripheral surface of the light emitter unit.

In the above configuration, even in a case where the light emitter unit is installed in the hammer housing portion that vibrates due to impact when the impact tool is used, the light emitter unit can be effectively protected by the buffer member from vibration.

In the one or more embodiments, the light emitter unit may be held in the hammer housing portion via the buffer member in the installation portion in a state of not being in contact with the hammer housing portion.

In the above configuration, since the light emitter unit is not in direct contact with the hammer housing portion, it is possible to prevent generation of wear or the like of the light emitter unit due to the vibration of the hammer housing portion.

In the one or more embodiments, the hammer housing portion may have a wall portion defining an outer periphery of the installation portion. The wall portion may have a slit that is connected to the light emitter unit and the inside of the prop portion and that allows the lead wire to pass therethrough.

In the above configuration, the light emitter unit can be protected by the wall portion from external collision. The slit in the wall portion allows the lead wire to easily enter the inside of the prop portion from the light emitter unit.

In the one or more embodiments, the impact tool may further include a guide portion that guides the lead wire to pass through the slit without contacting the hammer housing portion.

In the above configuration, the lead wire can be protected by the guide portion from the vibration generated in the hammer housing portion.

In the one or more embodiments, the impact tool may further include a buffer member arranged between the hammer housing portion and the light emitter unit. The light emitter unit may have a protrusion portion that enters the inside of the prop portion through the slit. The guide portion may be defined by a passage portion surrounded by the buffer member and the protrusion portion inside the slit.

In the above configuration, the light emitter unit can be effectively protected by the buffer member from the vibration. The guide portion can be configured by utilization of a part (protrusion portion) of the light emitter unit and the buffer member. Thus, the number of parts can be reduced as compared with a case where a guide portion is provided separately from the buffer member.

In the one or more embodiments, the impact tool may further include an annular first protective cover configured to cover: the wall portion including the slit; an end portion of the prop portion, the end portion being adjacent to the slit; and an outer peripheral portion of the front surface of the light emitter unit.

In the above configuration, the first protective cover can reduce impact at the time of collision with an external object of when the impact tool is used.

In the one or more embodiments, the hammer housing portion may include a front tubular portion that forms an inner peripheral surface of the installation portion and that surrounds the anvil. The impact tool may further include an annular second protective cover configured to cover the front tubular portion and an inner peripheral portion of the front surface of the light emitter unit.

In the above configuration, the second protective cover can reduce impact at the time of collision with an external object of when the impact tool is used. By covering the outer peripheral portion and the inner peripheral portion of the front surface of the light emitter unit with the first protective cover and the second protective cover, it is possible to effectively protect the light emitter unit while securing a light emission region of the light emitter unit.

In the one or more embodiments, the impact tool may include a motor, a motor housing portion that houses the motor, a hammer rotated by the motor, an anvil impacted by the hammer in a rotation direction, a hammer housing portion that houses the hammer, an annular light emitter unit that is arranged at a front portion of the hammer housing portion and that surrounds the anvil, and an annular handle portion arranged below the motor housing portion and the hammer housing portion.

In the above configuration, a part of the annular handle portion can function as a grip portion, and the other part can function as a prop portion. Since the annular light emitter unit surrounding the anvil is arranged at a front portion of the hammer housing portion, a periphery of the anvil can be appropriately illuminated. As a result, it is possible to appropriately illuminate the periphery of the anvil in the impact tool having the prop portion.

Hereinafter, an embodiment will be described with reference to the drawings. In the embodiment, a positional relationship of parts will be described by utilization of terms of left, right, front, rear, up, and down. These terms indicate a relative position or direction with respect to a center of an impact tool.

Figure 2:
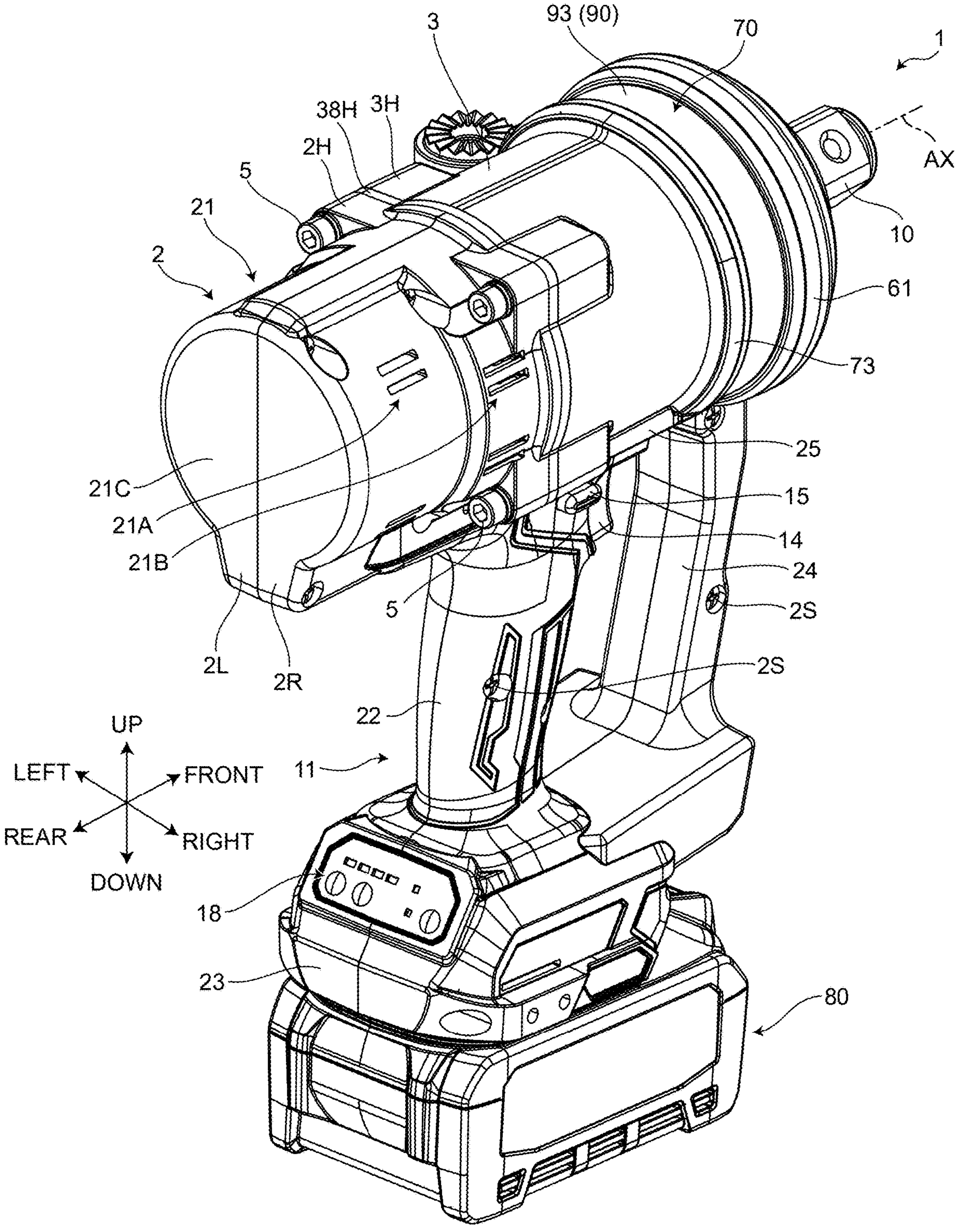
FIG. 2 is a rear perspective view illustrating the impact tool according to the embodiment.
Figure 3:
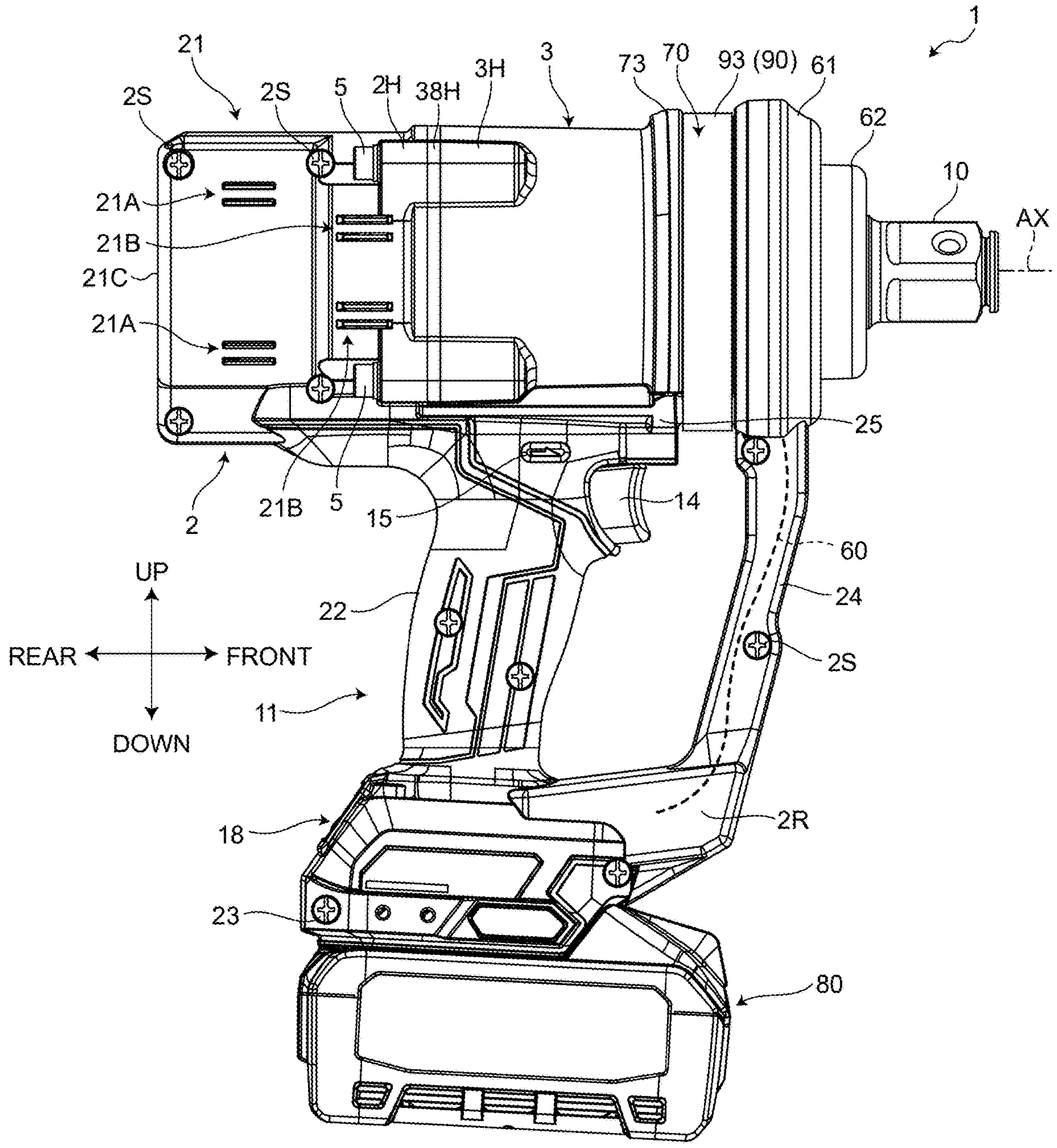
FIG. 3 is a right side view illustrating the impact tool according to the embodiment.
Figure 4:
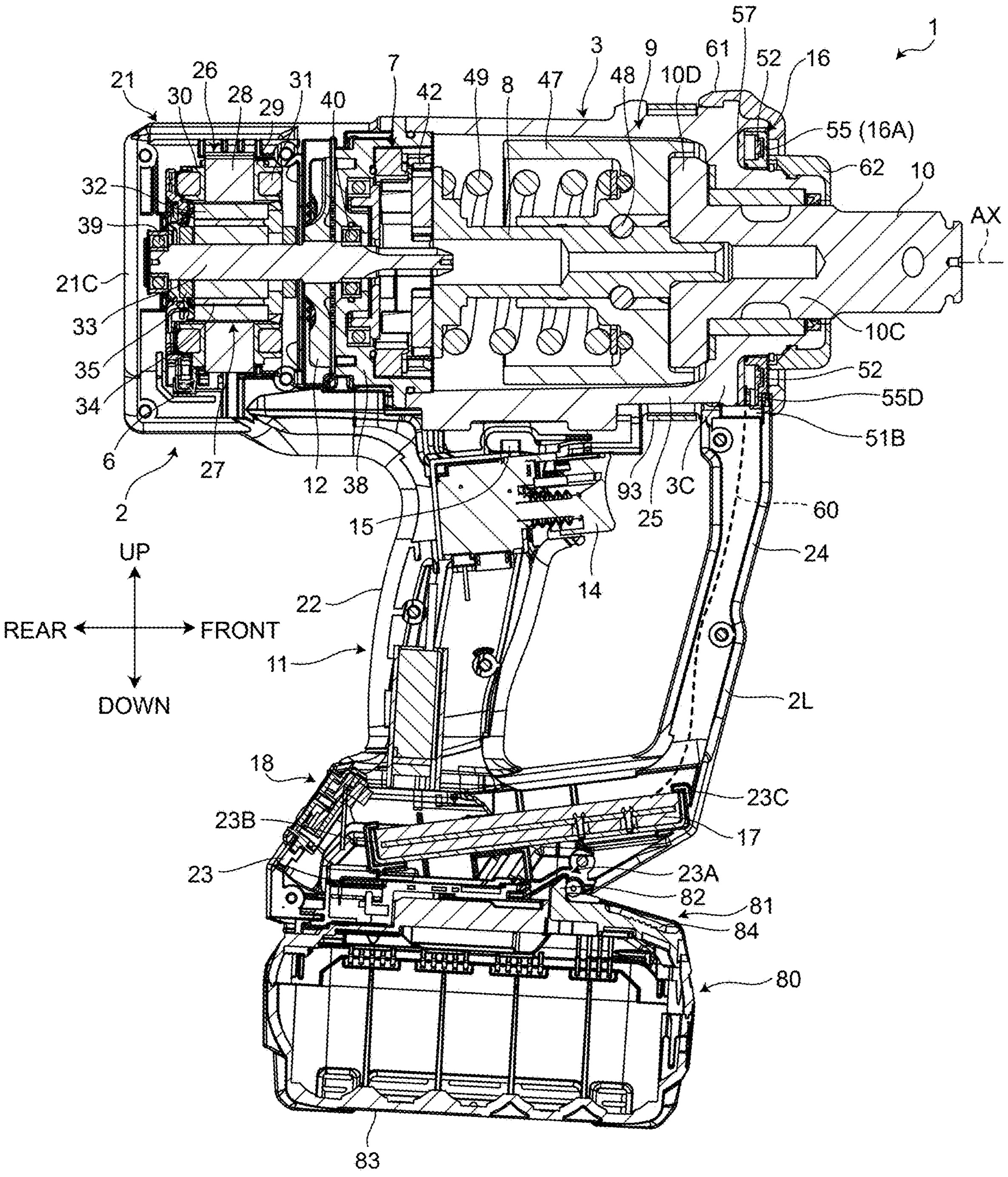
FIG. 4 is a longitudinal sectional view illustrating the impact tool according to the embodiment.
Figure 5:
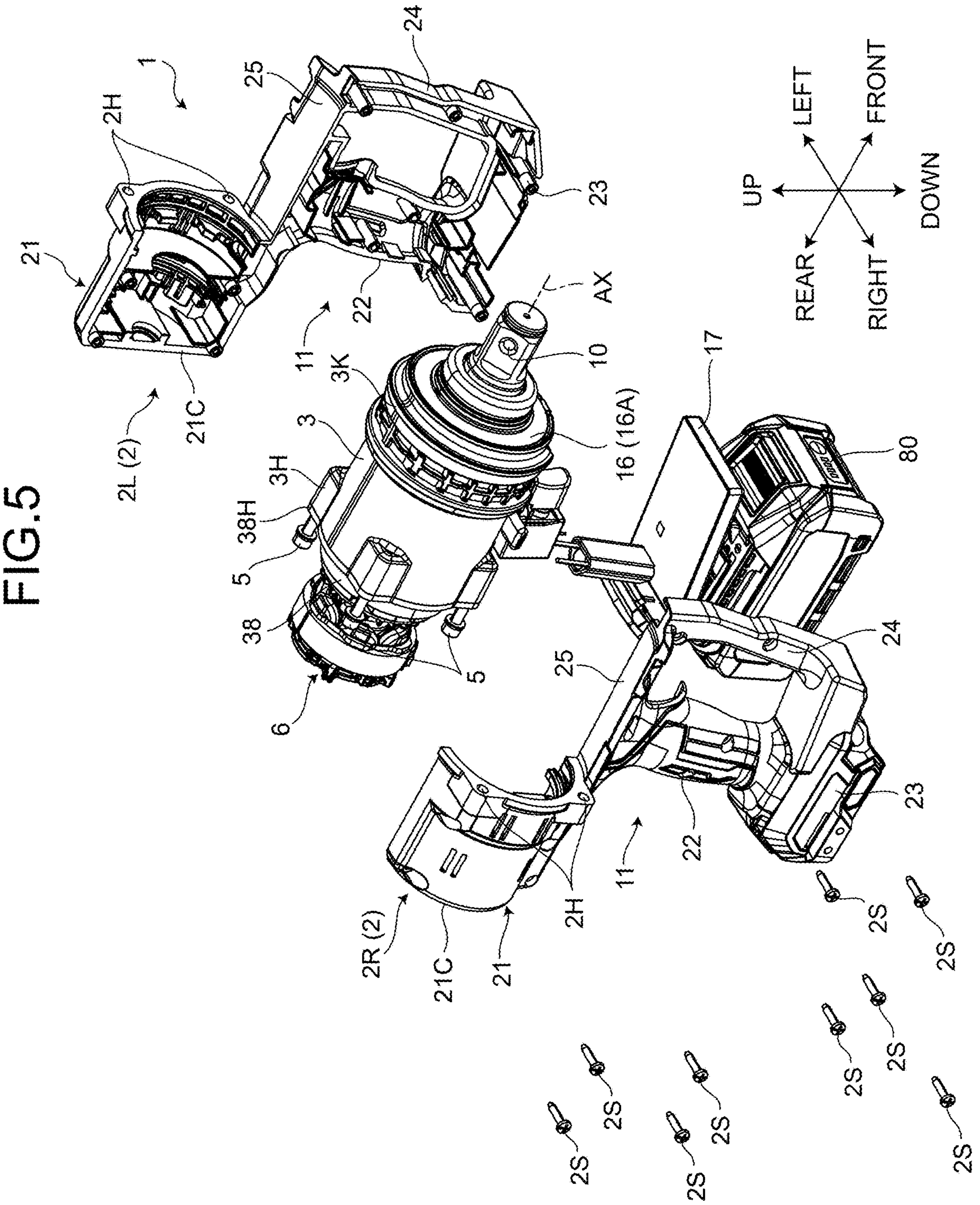
FIG. 5 is an exploded perspective view illustrating a housing according to the embodiment.
Figure 6:
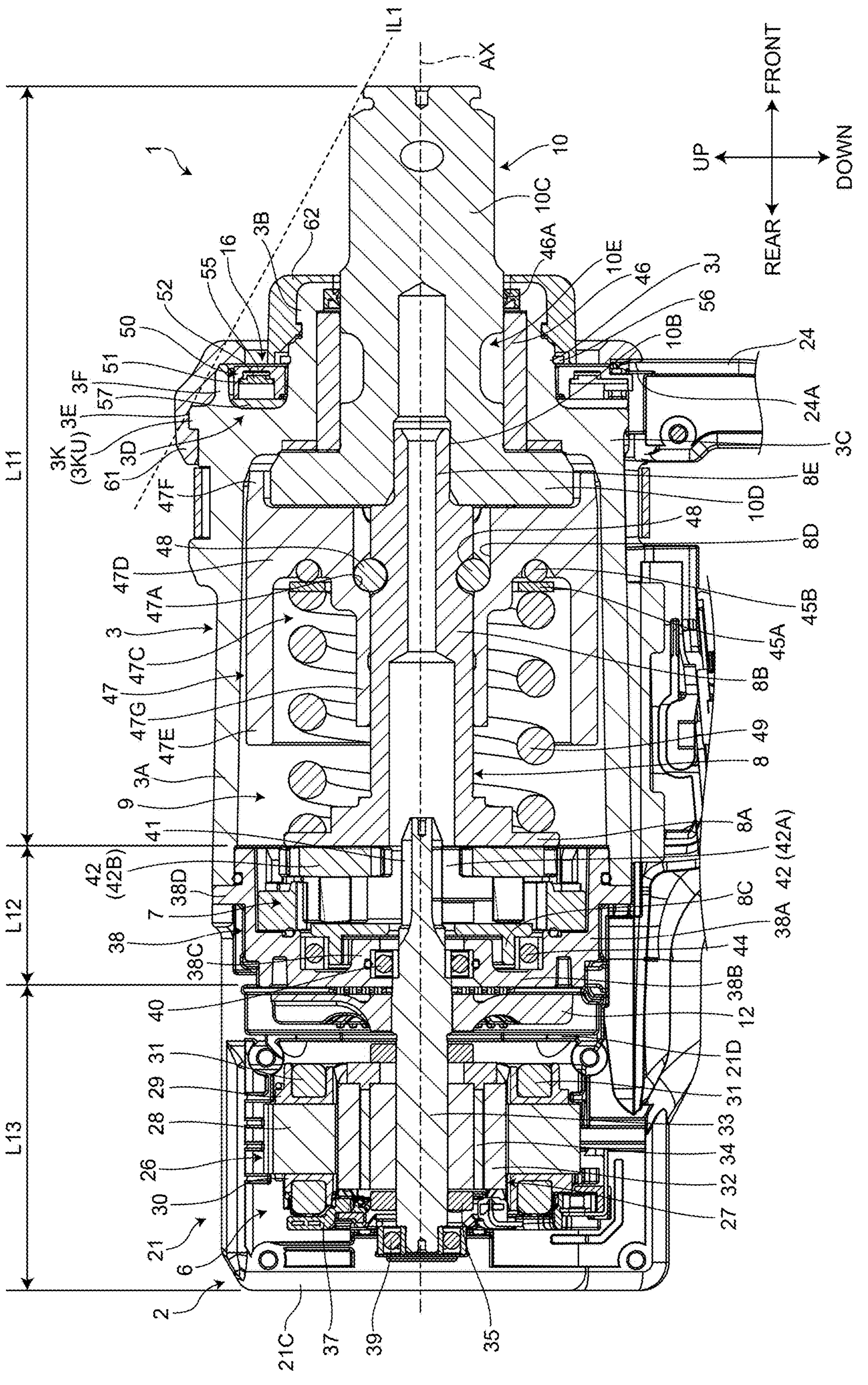
FIG. 6 is a longitudinal sectional view illustrating an upper portion of the impact tool according to the embodiment.

FIG. 1 is a front perspective view illustrating an impact tool 1 according to the embodiment. FIG. 2 is a rear perspective view illustrating the impact tool 1 according to the embodiment. FIG. 3 is a right side view illustrating the impact tool 1 according to the embodiment. FIG. 4 is a longitudinal sectional view illustrating the impact tool 1 according to the embodiment. FIG. 5 is an exploded perspective view illustrating a housing 2 according to the embodiment. FIG. 6 is a longitudinal sectional view illustrating an upper portion of the impact tool 1 according to the embodiment.

In the embodiment, the impact tool 1 is a power tool having an electric motor 6 as a power source. A direction parallel to a rotation axis AX of the motor 6 is appropriately referred to as an axial direction, a direction around the rotation axis AX is appropriately referred to as a circumferential direction or a rotation direction, and a radiation direction of the rotation axis AX is appropriately referred to as a radial direction. In the radial direction, a position close to or a direction approaching the rotation axis AX is appropriately referred to as an inner side in the radial direction or an inner peripheral side, and a position far from or a direction away from the rotation axis AX is appropriately referred to as an outer side in the radial direction or an outer peripheral side. In the embodiment, the rotation axis AX extends in a front-rear direction. One side in the axial direction is a front side (front side), and the other side in the axial direction is a rear side (rear side).

In the embodiment, the impact tool 1 is an impact wrench. The impact tool 1 includes a housing 2, a hammer housing portion 3, a screw 5, a motor 6, a speed reduction mechanism 7, a spindle 8, an impact mechanism 9, an anvil 10, a handle portion 11, a fan 12, a trigger lever 14, a forward/reverse rotation switching lever 15, and a light emitter unit 16.

The housing 2 is made of a synthetic resin. In the embodiment, the housing 2 is made of nylon. The housing 2 includes a left housing 2L and a right housing 2R arranged on a right side of the left housing 2L. The left housing 2L and the right housing 2R are fixed by a plurality of screws 2S. The housing 2 includes a pair of split housings.

The housing 2 includes a motor housing portion 21 and the handle portion 11. The handle portion 11 includes a grip portion 22, a battery holding portion 23, a prop portion 24, and a connection portion 25.

The motor housing portion 21 has a tubular shape. The motor housing portion 21 has a bottomed tubular shape with an opened front portion and a closed rear portion. The motor housing portion 21 houses the motor 6. The motor housing portion 21 houses the fan 12 and a part of a gear case 38. Screw boss portions 2H are provided in the motor housing portion 21.

The grip portion 22 extends downward from the motor housing portion 21. The grip portion 22 is provided across the motor housing portion 21 and the hammer housing portion 3 in the front-rear direction. The trigger lever 14 is provided on an upper portion of the grip portion 22. The grip portion 22 is gripped by an operator.

The prop portion 24 is arranged forward of grip portion 22. The prop portion 24 is arranged at a position away from grip portion 22 on the front side. A space between the grip portion 22 and the prop portion 24 is a space in which fingers gripping the grip portion 22 are placed. The prop portion 24 extends below the motor housing portion 21 or the hammer housing portion 3. In the embodiment, the prop portion 24 extends below the hammer housing portion 3. Specifically, the prop portion 24 is provided to extend downward from a front surface portion 3C of the hammer housing portion 3. The prop portion 24 is arranged directly below the light emitter unit 16. In the front-rear direction, a position of the light emitter unit 16 and a position of at least a part of the prop portion 24 coincide with each other. The prop portion 24 may extend below the motor housing portion 21. The prop portion 24 is hollow. An upper end of the prop portion 24 is open. In the embodiment, the lead wire 60 electrically connected to the light emitter unit 16 passes through the inside of the prop portion 24. In each of the drawings, the lead wire 60 is indicated by a dotted line for convenience.

The battery holding portion 23 is connected to the grip portion 22 and the prop portion 24. The battery holding portion 23 is connected to a lower end portion of the grip portion 22. The battery holding portion 23 is connected to a lower end portion of the prop portion 24. In each of the front-rear direction and a left-right direction, an outer dimension of the battery holding portion 23 is larger than an outer dimension of the grip portion 22. The battery holding portion 23 extends forward from directly below the grip portion 22. The battery holding portion 23 is connected to the lower end portion of the prop portion 24 at a front end portion. A battery pack 80 can be attached to/detached from the battery holding portion 23.

As illustrated in FIG. 4 and FIG. 5, the connection portion 25 is connected to the grip portion 22 and the prop portion 24. The connection portion 25 connects an upper end of the grip portion 22 and the upper end of the prop portion 24. The connection portion 25 extends in the front-rear direction. The connection portion 25 is along an outer peripheral surface of the hammer housing portion 3.

The handle portion 11 is arranged below the motor housing portion 21 and the hammer housing portion 3. The handle portion 11 is constituted by the grip portion 22, the battery holding portion 23, the prop portion 24, and the connection portion 25. The handle portion 11 has an annular shape, which is defied by the grip portion 22, the battery holding portion 23, the prop portion 24, and the connection portion 25. The handle portion 11 extends in an up-down direction and the front-rear direction. The grip portion 22 forms a side of a rear portion of the handle portion 11. The prop portion 24 forms a side of a front portion of the handle portion 11. The battery holding portion 23 forms a side of a lower portion of the handle portion 11. The connection portion 25 forms a side of an upper portion of the handle portion 11. As illustrated in FIG. 3, the handle portion 11 has a substantially D-shaped annular shape when viewed in the left-right direction. Each of the portions constituting the handle portion 11 is formed integrally with the housing 2.

The motor housing portion 21 has intake ports 21A. The motor housing portion 21 has exhaust ports 21B. Air in an external space of the housing 2 flows into an internal space of the housing 2 via the intake ports 21A. Air in the internal space of the housing 2 flows out to the external space of the housing 2 via the exhaust ports 21B.

The gear case 38 is connected to the front portion of the motor housing portion 21. The gear case 38 houses the speed reduction mechanism 7. As illustrated in FIG. 6, the gear case 38 houses a rotor bearing 40 and a spindle bearing 44. The gear case 38 includes a tubular portion 38A extending in the front-rear direction, a bottom plate portion 38B, a holding tubular portion 38C, and a flange portion 38D. The tubular portion 38A has a substantially cylindrical shape. The tubular portion 38A surrounds a periphery of the speed reduction mechanism 7. The bottom plate portion 38B extends radially inward from a rear end of the tubular portion 38A. The holding tubular portion 38C is connected to an end portion on the inner side in the radial direction of the bottom plate portion 38B and extends forward. An outer diameter of the holding tubular portion 38C is smaller than an inner diameter of the tubular portion 38A. The holding tubular portion 38C is arranged on the inner side of the tubular portion 38A. The holding tubular portion 38C holds the rotor bearing 40. The rotor 27 is inserted into the holding tubular portion 38C. The spindle bearing 44 is arranged between an outer periphery of the holding tubular portion 38C and an inner periphery of the tubular portion 38A. The speed reduction mechanism 7 is arranged in a space on the front side of the holding tubular portion 38C inside the tubular portion 38A. The flange portion 38D extends to the outer side in the radial direction from a front end portion of the tubular portion 38A. The flange portion 38D is provided with screw boss portions 38H (see FIG. 7). The gear case 38 is made of metal. In the embodiment, the gear case 38 is made of aluminum.

The hammer housing portion 3 houses the spindle 8. The hammer housing portion 3 houses a hammer 47. The hammer housing portion 3 houses the impact mechanism 9 including the hammer 47. The hammer housing portion 3 houses a part of the anvil 10. The hammer housing portion 3 is made of metal. In the embodiment, the hammer housing portion 3 is made of aluminum. The hammer housing portion 3 has a tubular shape. In the embodiment, the hammer housing portion 3 has a cylindrical shape.

The hammer housing portion 3 includes a rear tubular portion 3A, a front tubular portion 3B, the front surface portion 3C, and the screw boss portions 3H. The front tubular portion 3B is arranged on the front side of the rear tubular portion 3A. An outer diameter of the rear tubular portion 3A is larger than an outer diameter of the front tubular portion 3B. An inner diameter of the rear tubular portion 3A is larger than an inner diameter of the front tubular portion 3B. The front surface portion 3C forms an end surface on the front side of the hammer housing portion 3. The front surface portion 3C extends radially inward from a front end portion of the rear tubular portion 3A. The front surface portion 3C is arranged to connect the front end portion of the rear tubular portion 3A and a rear end portion of the front tubular portion 3B. The front surface portion 3C has an annular shape. The front tubular portion 3B is arranged to protrude forward from the front surface portion 3C.

The hammer housing portion 3 is connected to a front portion of the gear case 38. The motor housing portion 21 and the gear case 38 are fixed to a rear portion of the hammer housing portion 3 with the screws 5. Each of the screws 5 is inserted from a rear side of the screw boss portion 2H into an opening provided in the screw boss portion 2H and an opening provided in the screw boss portion 38H sequentially, and then inserted into a screw hole provided in the screw boss portion 3H. The four screw boss portions 2H, four screw boss portions 38H, and four screw boss portions 3H are provided in the circumferential direction. The four screws 5 are provided in the circumferential direction. The hammer housing portion 3, the gear case 38, and the motor housing portion 21 are fixed to each other by the screws 5.

At least a part of a rear portion of the gear case 38 is housed in the motor housing portion 21. At least a part of a front portion of the gear case 38 is housed in the hammer housing portion 3. The hammer housing portion 3 is fixed to the housing 2 in the front-rear direction by the screws 5. The hammer housing portion 3 is placed on the upper surface of the handle portion 11. That is, the hammer housing portion 3 is placed on an upper surface of the grip portion 22, an upper surface of the prop portion 24, and an upper surface of the connection portion 25.

The motor 6 is a power source of the impact tool 1. The motor 6 generates rotational force. The motor 6 is an electric motor. The motor 6 is an inner rotor-type brushless motor. The motor 6 includes a stator 26 and a rotor 27. The stator 26 is supported by the motor housing portion 21. At least a part of the rotor 27 is arranged inside the stator 26. The rotor 27 rotates with respect to the stator 26. The rotor 27 rotates about a rotation axis AX extending in the front-rear direction.

The stator 26 includes a stator core 28, a front insulator 29, a rear insulator 30, and coils 31.

The stator core 28 is arranged radially outside the rotor 27. The stator core 28 includes a plurality of stacked steel sheets. The steel sheet is a metal sheet including iron as a main component. The stator core 28 has a tubular shape. The stator core 28 includes a plurality of teeth that respectively supports the coils 31.

The front insulator 29 is provided at a front portion of the stator core 28. The rear insulator 30 is provided at a rear portion of the stator core 28. Each of the front insulator 29 and the rear insulator 30 is an electric insulating member made of a synthetic resin. The front insulator 29 is arranged to cover a part of surfaces of the teeth. The rear insulator 30 is arranged to cover a part of the surfaces of the teeth.

The coils 31 are mounted on the stator core 28 via the front insulator 29 and the rear insulator 30. The coils 31 are arranged around the respective teeth of the stator core 28 via the front insulator 29 and the rear insulator 30. The coils 31 and the stator core 28 are electrically insulated by the front insulator 29 and the rear insulator 30.

The rotor 27 rotates about the rotation axis AX. The rotor 27 includes a rotor core portion 32, a rotor shaft portion 33, and a rotor magnet 34.

Each of the rotor core portion 32 and the rotor shaft portion 33 is made of steel. In the embodiment, the rotor core portion 32 and the rotor shaft portion 33 are integrated. A front portion of the rotor shaft portion 33 protrudes forward from a front end surface of the rotor core portion 32. A rear portion of the rotor shaft portion 33 protrudes rearward from a rear end surface of the rotor core portion 32.

The rotor magnet 34 is fixed to the rotor core portion 32. The rotor magnet 34 has a flat plate shape. The rotor magnet 34 is arranged inside the rotor core portion 32.

A balancer 35 is provided in the rotor shaft portion 33. The balancer 35 is a weight made of metal such as brass and is provided to adjust weight balance of the rotor 27.

A sensor substrate 37 is attached to the rear insulator 30. The sensor substrate 37 includes an annular circuit board and a magnetic sensor supported by the circuit board. The magnetic sensor detects a position of the rotor 27 in the rotation direction by detecting a position of the rotor magnet 34.

The rear portion of the rotor shaft portion 33 is rotatably supported by a rotor bearing 39. A front portion of the rotor bearing 39 is rotatably supported by a rotor bearing 40. The rotor bearing 39 is held by a rear plate portion 21C of the motor housing portion 21. The rotor bearing 40 is held by the gear case 38. The front end portion of the rotor shaft portion 33 passes through the holding tubular portion 38C of the gear case 38 and is connected to the speed reduction mechanism 7.

A pinion gear 41 is formed at a front end portion of the rotor shaft portion 33. The pinion gear 41 is coupled to at least a part of the speed reduction mechanism 7. The rotor shaft portion 33 is coupled to the speed reduction mechanism 7 via the pinion gear 41.

The speed reduction mechanism 7 transmits the rotational force of the motor 6 to the spindle 8 and the anvil 10. The speed reduction mechanism 7 is housed in the gear case 38. The speed reduction mechanism 7 includes a plurality of gears. The speed reduction mechanism 7 is arranged on the front side of the motor 6. The speed reduction mechanism 7 couples the rotor shaft portion 33 and the spindle 8. The gears of the speed reduction mechanism 7 are driven by the rotor 27. The speed reduction mechanism 7 transmits the rotation of the rotor 27 to the spindle 8. The speed reduction mechanism 7 rotates the spindle 8 at a rotational speed lower than a rotational speed of the rotor shaft portion 33. The speed reduction mechanism 7 includes a planetary gear mechanism.

Figure 7:
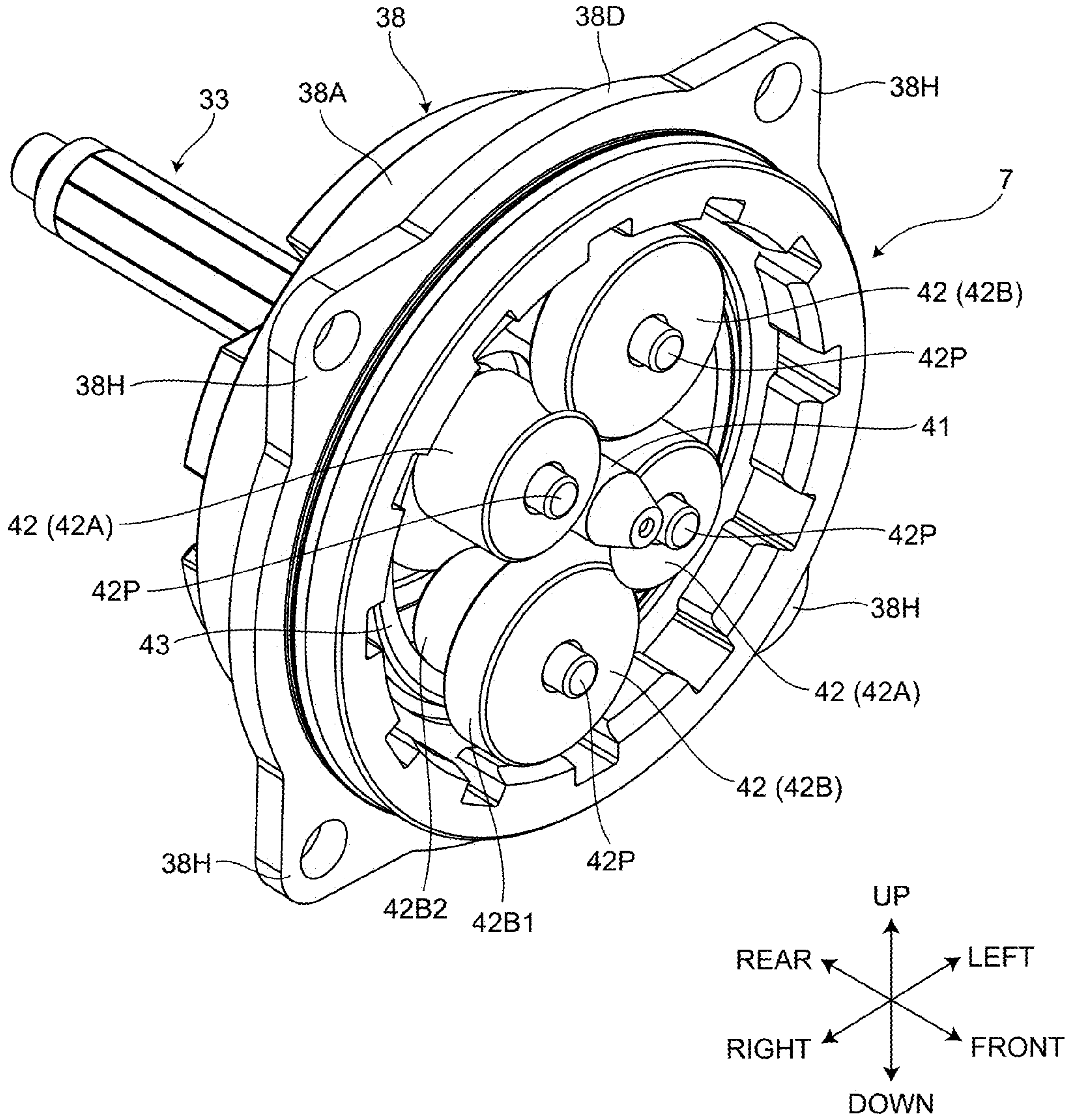
FIG. 7 is a perspective view illustrating a speed reduction mechanism according to the embodiment.

FIG. 7 is a perspective view illustrating the speed reduction mechanism 7 according to the embodiment. The speed reduction mechanism 7 includes a plurality of planetary gears 42 arranged around the pinion gear 41 and an internal gear 43 arranged around the plurality of planetary gears 42. Each of the pinion gear 41, the planetary gears 42, and the internal gear 43 is housed in the gear case 38. The planetary gears 42 include a first planetary gear 42A and a second planetary gear 42B. The first planetary gear 42A meshes with the pinion gear 41 and a first gear portion 42B1 of the second planetary gear 42B. The second planetary gear 42B includes the first gear portion 42B1 and a second gear portion 42B2 at different positions in the axial direction. The second planetary gear 42B meshes with the internal gear 43 in the second gear portion 42B2. The internal gear 43 has an annular shape and meshes with the second gear portion 42B2. The internal gear 43 is fixed to the gear case 38. The internal gear 43 is always non-rotatable with respect to the gear case 38. Each of the planetary gears 42 (first planetary gear 42A and second planetary gear 42B) is rotatably supported by the spindle 8 via a pin 42P. The spindle 8 is rotated by the planetary gears 42.

When the rotor shaft portion 33 rotates by driving of the motor 6, the pinion gear 41 rotates, and the first planetary gear 42A and the second planetary gear 42B revolve around the pinion gear 41. The second planetary gear 42B revolves while meshing with internal teeth of the internal gear 43. By the revolution of each of the planetary gears 42, the spindle

8 connected to each of the planetary gears 42 via the pin 42P rotates at a rotational speed lower than the rotational speed of the rotor shaft portion 33.

As illustrated in FIG. 6, the spindle 8 is rotated by the rotational force of the motor 6. The spindle 8 is arranged on the front side of at least a part of the motor 6. The spindle 8 is arranged on the front side of the stator 26. At least a part of the spindle 8 is arranged on the front side of the rotor 27. At least a part of the spindle 8 is arranged on the front side of the speed reduction mechanism 7. The spindle 8 is rotated by the rotor 27. The spindle 8 is rotated by rotational force of the rotor 27 transmitted via the speed reduction mechanism 7.

The spindle 8 includes a flange portion 8A and a spindle shaft portion 8B protruding forward from the flange portion 8A. The planetary gears 42 are rotatably supported by the flange portion 8A via the pins 42P. A rotation axis of the spindle 8 coincides with the rotation axis AX of the motor 6. The spindle 8 rotates about the rotation axis AX.

The spindle 8 is rotatably supported by the spindle bearing 44. The spindle 8 has an arc-shaped rib 8C protruding rearward from a rear portion of the flange portion 8A. The spindle bearing 44 is arranged on an outer side of the rib 8C. In the embodiment, an inner race of the spindle bearing 44 is connected to the rib 8C, and an outer race of the spindle bearing 44 is supported by the gear case 38.

The impact mechanism 9 is driven by the motor 6. The rotational force of the motor 6 is transmitted to the impact mechanism 9 via the speed reduction mechanism 7 and the spindle 8. The impact mechanism 9 impacts the anvil 10 in the rotation direction with rotational force of the spindle 8 rotated by the motor 6. The impact mechanism 9 includes a hammer 47, balls 48, and a coil spring 49. The impact mechanism 9 including the hammer 47 is housed in the hammer housing portion 3.

Figure 8:
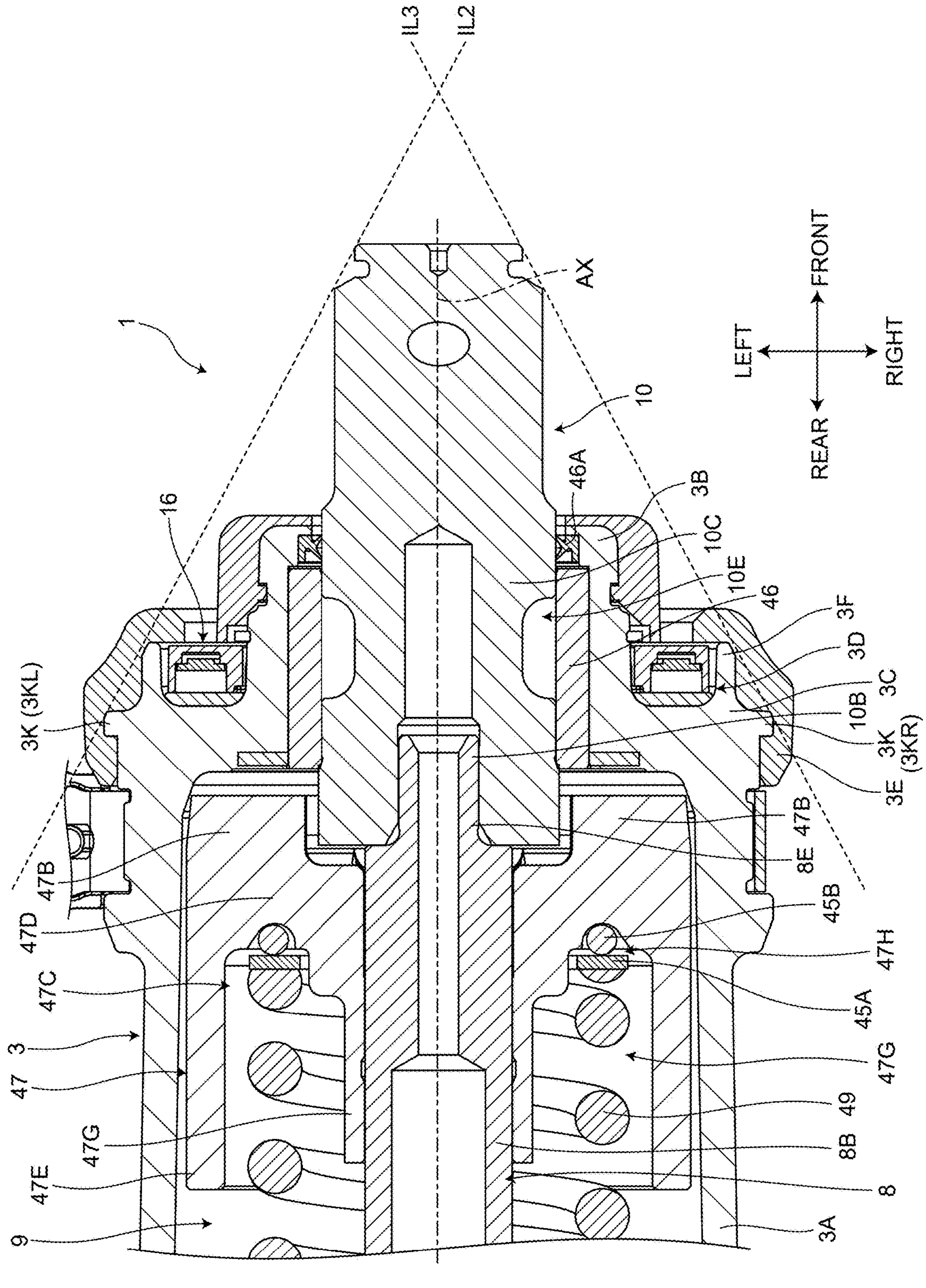
FIG. 8 is a cross-sectional view illustrating an impact mechanism according to the embodiment.

FIG. 8 is a cross-sectional view illustrating the impact mechanism 9 according to the embodiment. As illustrated in FIG. 6 and FIG. 8, the hammer 47 is arranged on the front side of the speed reduction mechanism 7. The hammer 47 is housed in the rear tubular portion 3A. The hammer 47 is arranged around the spindle shaft portion 8B. The hammer 47 is held by the spindle shaft portion 8B. The balls 48 are arranged between the spindle shaft portion 8B and the hammer 47. The coil spring 49 is supported by the flange portion 8A and the hammer 47.

The hammer 47 includes an annular body portion 47D, a rear outer tubular portion 47E protruding rearward from an outer peripheral portion of the body portion 47D, a front outer tubular portion 47F protruding forward from the outer peripheral portion of the body portion 47D, an inner tubular portion 47G protruding rearward from an inner peripheral portion of the body portion 47D, a hammer groove 47A, and hammer protrusion portions 47B. The body portion 47D is arranged around the spindle shaft portion 8B. The body portion 47D has an annular shape. Each of the rear outer tubular portion 47E and the inner tubular portion 47G protrudes rearward from the body portion 47D. A recess portion 47C is defined by a rear surface of the body portion 47D, an inner peripheral surface of the rear outer tubular portion 47E, and an outer peripheral surface of the inner tubular portion 47G. The recess portion 47C is provided to be recessed forward from a rear end portion of the hammer 47. The recess portion 47C has a ring shape. Each of the hammer protrusion portions 47B protrudes forward from the body portion 47D. Each of the hammer protrusion portions 47B protrudes radially inward from an inner peripheral surface of the front outer tubular portion 47F. Two hammer protrusion portions 47B are provided. Since the rear outer tubular portion 47E and the front outer tubular portion 47F are provided, inertial force of the hammer 47 in the rotation direction increases.

The hammer 47 is rotated by the motor 6. The rotational force of the motor 6 is transmitted to the hammer 47 via the speed reduction mechanism 7 and the spindle 8. The hammer 47 is rotatable together with the spindle 8 with the rotational force of the spindle 8 rotated by the motor 6. A rotation axis of the hammer 47, the rotation axis of the spindle 8, and the rotation axis AX of the motor 6 coincide with each other. The hammer 47 rotates about the rotation axis AX.

The balls 48 are made of metal such as steel. The balls 48 are arranged between the spindle shaft portion 8B and the hammer 47. The spindle 8 has spindle grooves 8D in each of which at least a part of the corresponding ball 48 is arranged. The spindle grooves 8D are provided in a part of an outer peripheral surface of the spindle shaft portion 8B. The hammer 47 has hammer grooves 47A in each of which at least a part of the corresponding ball 48 is arranged. The hammer grooves 47A are provided in a part of an inner surface of the inner tubular portion 47G. The balls 48 are respectively arranged between the spindle grooves 8D and the hammer grooves 47A. Each of the balls 48 can roll in an inner side of the corresponding spindle groove 8D and an inner side of the corresponding hammer groove 47A. The hammer 47 can move with the balls 48. The spindle 8 and the hammer 47 can relatively move in each of the axial direction and the rotation direction in a movable range defined by the spindle groove 8D and the hammer groove 47A.

The coil spring 49 generates elastic force that moves the hammer 47 forward. The coil spring 49 is arranged between the flange portion 8A and the hammer 47. The coil spring 49 is provided around the spindle shaft portion 8B. A washer 45A is provided inside the recess portion 47C. The washer 45A is supported by the body portion 47D via balls 45B. The balls 45B are respectively arranged in ball grooves 47H (see FIG. 8) provided in the rear surface of the body portion 47D. A rear end portion of the coil spring 49 is supported by the flange portion 8A. A front end portion of the coil spring 49 is arranged inside the recess portion 47C and is supported by the washer 45A.

The anvil 10 is an output part of the impact tool 1 and is operated by the rotational force of the motor 6. The anvil 10 is rotated by the rotational force of the motor 6. At least a part of the anvil 10 is arranged on the front side of the hammer 47.

The anvil 10 includes a rod-shaped anvil shaft portion 10C and an anvil protrusion portion 10D. An outer shape of the anvil shaft portion 10C orthogonal to the rotation axis AX is substantially quadrangular. A socket as a tip tool is mounted on the anvil shaft portion 10C. In addition, a recess portion 10B is provided at a rear end portion of the anvil 10. A protrusion portion 8E is provided at a front end portion of the spindle shaft portion 8B. The protrusion portion 8E at the front end portion of the spindle shaft portion 8B is inserted into the recess portion 10B provided at the rear end portion of the anvil 10. The anvil protrusion portion 10D is provided at the rear end portion of the anvil 10. The anvil protrusion portion 10D protrudes radially outward from a rear end portion of the anvil shaft portion 10C.

The anvil 10 is rotatably supported by the anvil bearing 46. A rotation axis of the anvil 10, the rotation axis of the hammer 47, the rotation axis of the spindle 8, and the rotation axis AX of the motor 6 coincide with each other.

The anvil 10 rotates about the rotation axis AX. The anvil bearing 46 is arranged on an inner periphery of the front tubular portion 3B of the hammer housing portion 3. The anvil bearing 46 is held by the front tubular portion 3B. The front tubular portion 3B is arranged around the anvil shaft portion 10C. The anvil bearing 46 supports the anvil shaft portion 10C in a rotatable manner. As a result, the anvil bearing 46 supports the anvil 10 in the rotation direction. A groove portion 10E facing the front tubular portion 3B is formed in an outer peripheral surface of the anvil shaft portion 10C. Lubricant is placed in the groove portion 10E. A gap between a tip opening of the front tubular portion 3B and the anvil shaft portion 10C is sealed by a seal member 46A.

The hammer protrusion portion 47B can come into contact with the anvil protrusion portion 10D. When the motor 6 is driven in a state in which the hammer protrusion portion 47B and the anvil protrusion portion 10D are in contact with each other, the anvil 10 rotates together with the hammer 47 and the spindle 8.

The anvil 10 is impacted by the hammer 47 in the rotation direction. For example, when a load (torque) acting on the anvil 10 becomes high during screw tightening work, the anvil 10 can no longer be caused to rotate only by the power generated by the motor 6. When the anvil 10 can no longer be caused to rotate only by the power generated by the motor 6, the rotation of the anvil 10 and the hammer 47 will momentarily stop. The spindle 8 and the hammer 47 can move relative to each other in the axial direction and the circumferential direction via the balls 48. When the rotation of the hammer 47 momentarily stops, the rotation of the spindle 8 continues owing to the power generated by the motor 6. Thus, when the rotation of the hammer 47 has momentarily stopped and the spindle 8 continues to rotate, the balls 48 move rearward while being guided by the spindle grooves 8D and the hammer grooves 47A. The hammer 47 receives force from the balls 48 and moves rearward together with the balls 48. That is, while the rotation of the anvil 10 is momentarily stopped, the hammer 47 moves rearward owing to the rotation of the spindle 8. The contact between the hammer protrusion portion 47B and the anvil protrusion portion 10D is released by the movement of the hammer rearward.

After having moved rearward, the hammer 47 moves forward owing to elastic force of the coil spring 49. When the hammer moves forward, the hammer 47 receives force in the rotation direction from the balls 48. That is, the hammer 47 moves forward while rotating. When the hammer 47 moves forward while rotating, the hammer protrusion portion 47B comes into contact with the anvil protrusion portion 10D while rotating. As a result, the anvil protrusion portion 10D is impacted (hammered) by the hammer protrusion portion 47B in the rotation direction. The power of the motor 6 and the inertial force of the hammer 47 both act on the anvil 10. Thus, the anvil 10 can rotate about the rotation axis AX with a higher torque.

As illustrated in FIG. 6, the fan 12 is rotated by the rotational force of the motor 6. The fan 12 is arranged on the front side of the stator 26 of the motor 6. The fan 12 generates an air flow for cooling the motor 6. The fan 12 is fixed to the rotor 27. The fan 12 is fixed to a front portion of the rotor shaft portion 33. The fan 12 is arranged between the rotor bearing 40 and the stator 26. The fan 12 is rotated by the rotation of the rotor 27. When the rotor shaft portion 33 rotates, the fan 12 rotates together with the rotor shaft portion 33. When the fan 12 rotates, air in the external space of the housing 2 flows into the internal space of the housing 2 via the intake ports 21A. The air flowing into the internal space of the housing 2 circulates in the internal space of the housing 2 and cools the motor 6. The air circulating the internal space of the housing 2 flows out to the external space of the housing 2 via the exhaust ports 21B when the fan 12 rotates.

As illustrated in FIG. 4, the battery pack 80 is mounted on the battery holding portion 23. The battery pack 80 functions as a power source of the impact tool 1. The battery pack 80 includes a secondary battery. In the embodiment, the battery pack 80 includes a rechargeable lithium ion battery. By being mounted on the battery holding portion 23, the battery pack 80 can supply power to the impact tool 1. Each of the motor 6 and the light emitter unit 16 is driven with the power supplied from the battery pack 80.

The battery pack 80 has a release switch 81. The release switch 81 is arranged on a front portion of an upper surface of the battery pack 80. The release switch 81 is a push button. The release switch 81 moves downward by being pressed downward. The release switch 81 is biased upward by a biasing member (not illustrated). The release switch 81 includes an engagement hook portion 82 protruding upward from the upper surface of the battery pack 80 at a position of an upper movement limit, and a finger rest portion 84 to be pressed downward by the operator.

The battery holding portion 23 has an engagement recess portion 23A that comes into contact with the engagement hook portion 82. The engagement recess portion 23A is recessed upward from the lower surface of the battery holding portion 23. When the engagement hook portion 82 enters the inside of the engagement recess portion 23A, the battery holding portion 23 is engaged such that the battery pack 80 is not detached. When the release switch 81 is pressed down by pressing of the finger rest portion 84 and the engagement hook portion 82 is detached downward from the engagement recess portion 23A, the battery pack 80 can be detached from the battery holding portion 23. A front portion of a lower surface portion of the battery holding portion 23 is inclined obliquely upward toward the front side. In the upper surface of the battery pack 80, the front portion provided with the release switch 81 is inclined obliquely downward toward the front side.

The battery holding portion 23 includes a controller 17 that controls the light emitter unit 16, and an interface panel 18. The controller 17 includes a computer system. The controller 17 outputs control commands that control the motor 6. The controller 17 includes a circuit board on which a plurality of electronic parts are mounted. Examples of the electronic parts mounted on the circuit board include a processor such as a central processing unit (CPU), a non-volatile memory such as a read only memory (ROM) or a storage, a volatile memory such as a random access memory (RAM), a transistor, a capacitor, and a resistor.

The controller 17 sets a driving condition of the motor 6 based on operation on the interface panel 18. As described above, the driving condition of the motor 6 includes a current threshold.

The interface panel 18 is provided in the battery holding portion 23. The interface panel 18 includes an operation device and a display device. The interface panel 18 has a plate shape. The operation device includes an operation button. Examples of the display device include a segment display including a plurality of segment light emitters, a flat panel display such as a liquid crystal display, and an indicator-type display in which a plurality of light emitting diodes is arranged.

The trigger lever 14 is provided on the grip portion 22. The trigger lever 14 is operated by the operator to start the motor 6. Driving and stopping of the motor 6 are switched by the operation of the trigger lever 14.

The forward/reverse rotation switching lever 15 is provided at the upper portion of the grip portion 22. The forward/reverse rotation switching lever 15 is operated by the operator. When the forward/reverse rotation switching lever 15 is operated, the rotation direction of the motor 6 is switched from one of a forward rotation direction and a reverse rotation direction to the other. The rotation direction of the spindle 8 is switched by switching of the rotation direction of the motor 6.

Light Emitter Unit

Figure 9:
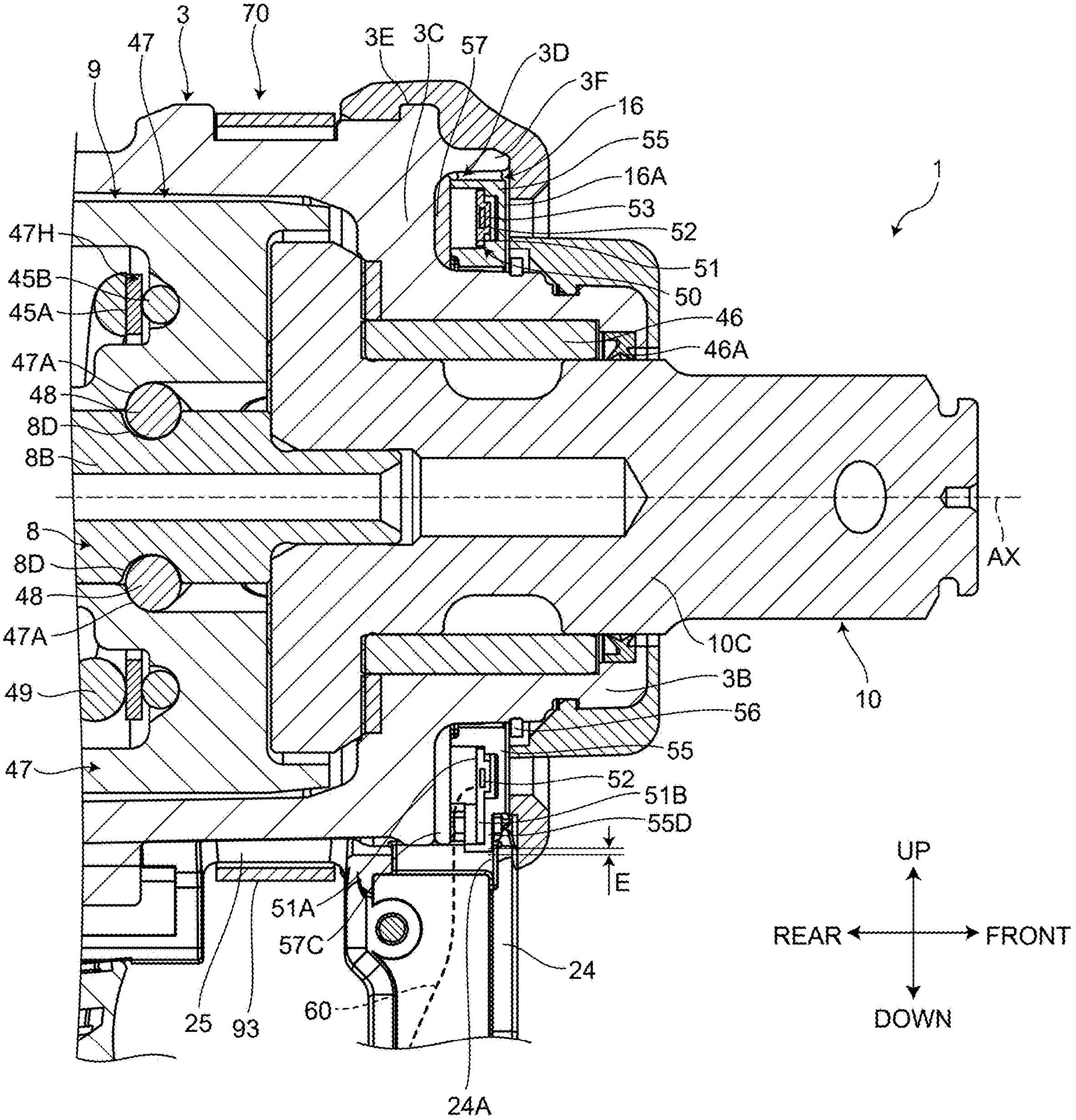
FIG. 9 is a longitudinal sectional view illustrating the upper portion of the impact tool according to the embodiment according to the embodiment.
Figure 10:
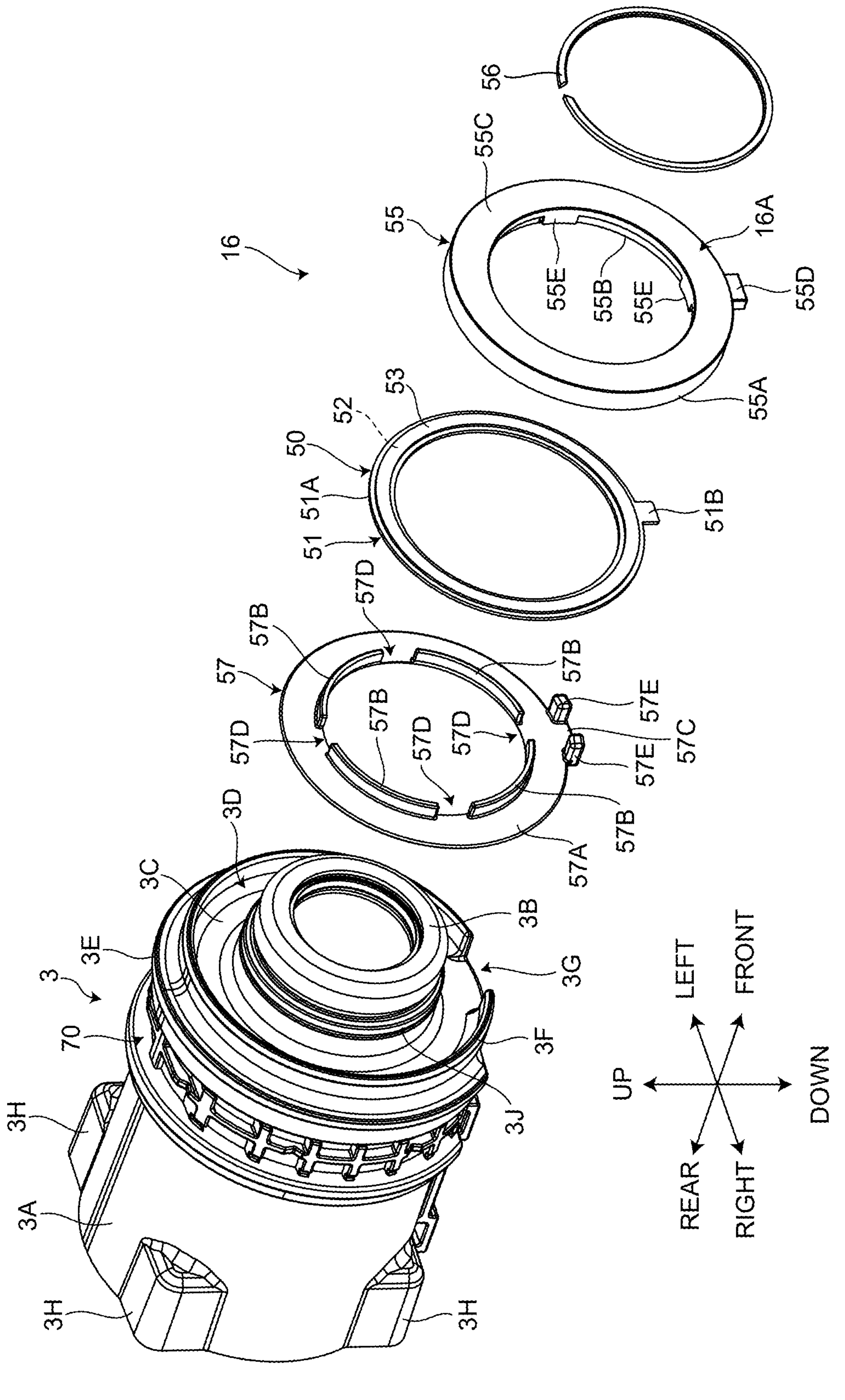
FIG. 10 is an exploded perspective view illustrating a light emitter unit according to the embodiment.
Figure 11:
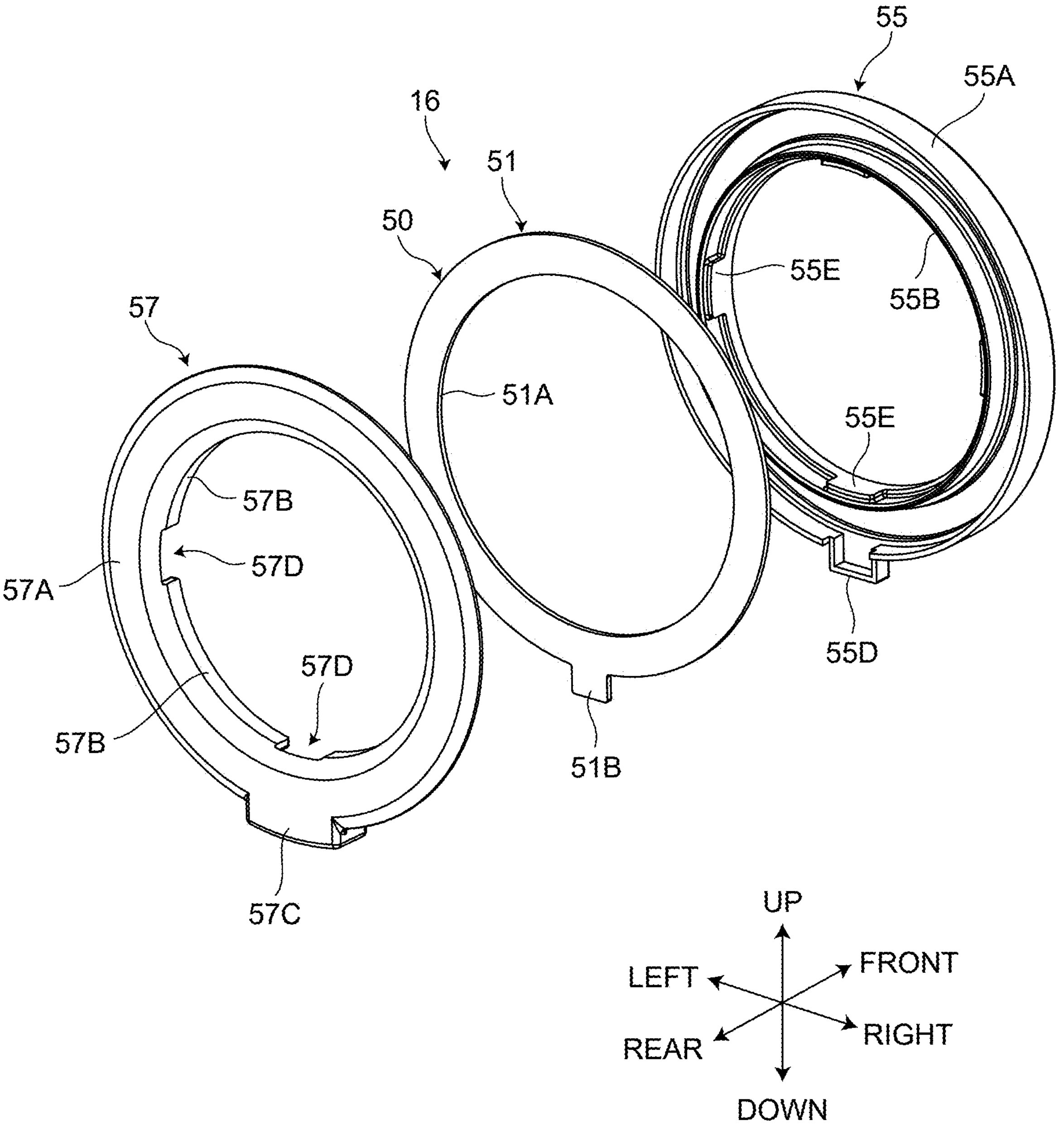
FIG. 11 is a rear exploded perspective view illustrating the light emitter unit according to the embodiment.
Figure 12:
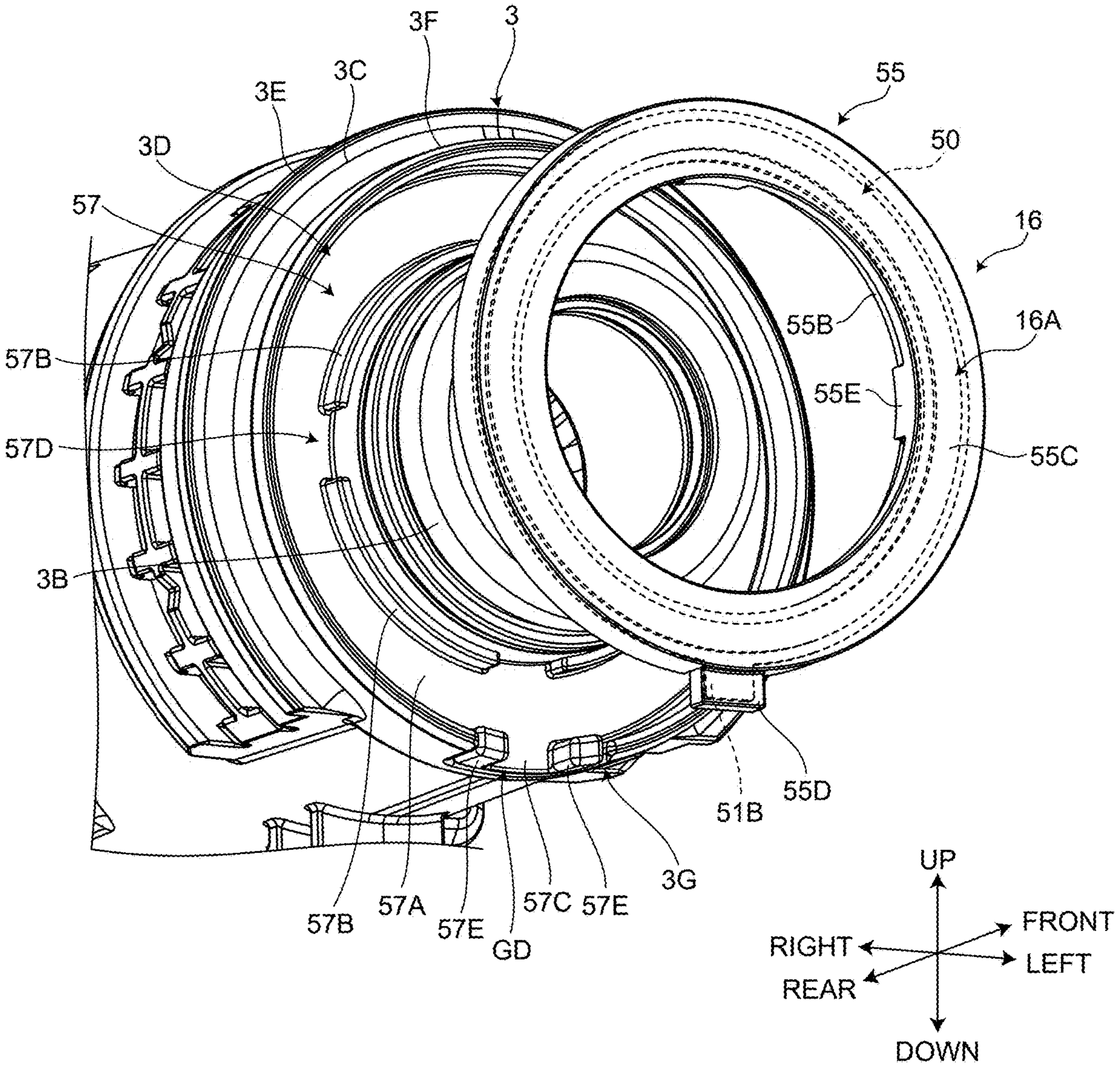
FIG. 12 is an exploded perspective view illustrating the light emitter unit and an installation portion according to the embodiment.
Figure 13:
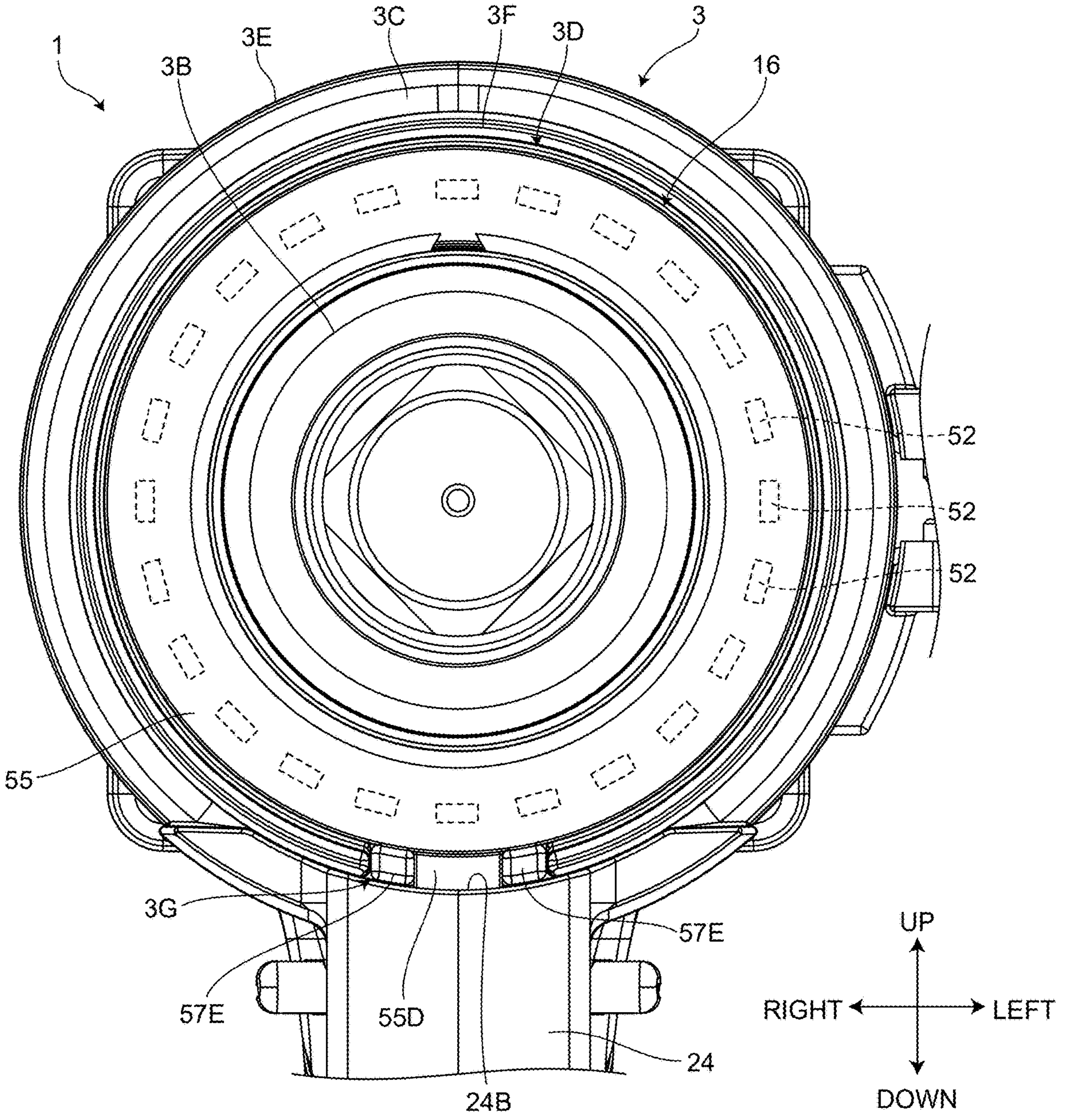
FIG. 13 is a front view illustrating the light emitter unit arranged in the installation portion.
Figure 14:
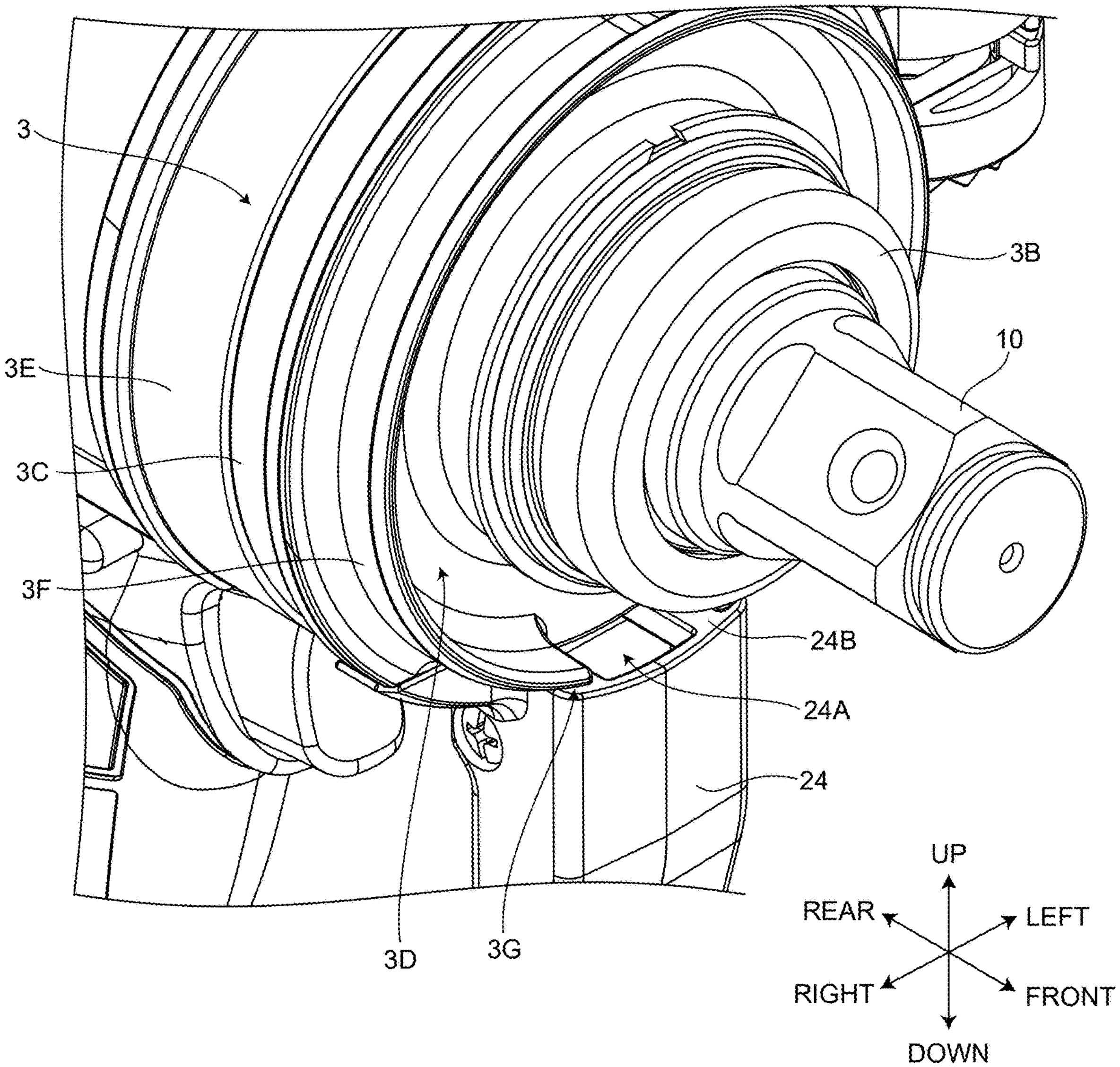
FIG. 14 is a perspective view illustrating an opening of the prop portion according to the embodiment.
Figure 15:
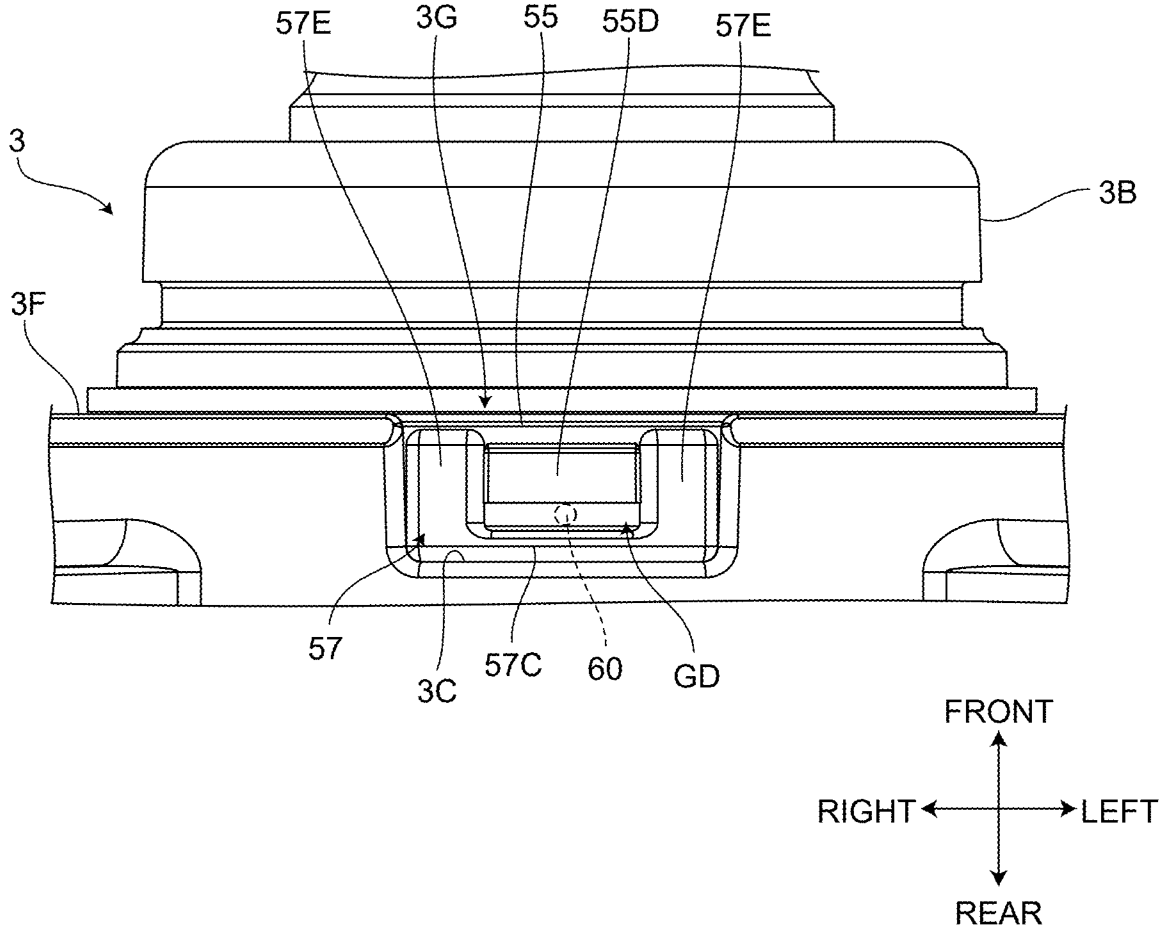
FIG. 15 is a view of a slit of a hammer housing portion according to the embodiment as viewed from a lower side.

FIG. 9 is a longitudinal sectional view illustrating an upper portion of the impact tool 1 according to the embodiment according to the embodiment. FIG. 10 is an exploded perspective view illustrating the light emitter unit 16 according to the embodiment. FIG. 11 is a rear exploded perspective view illustrating the light emitter unit 16 according to the embodiment. FIG. 12 is an exploded perspective view illustrating the light emitter unit 16 and an installation portion 3D according to the embodiment. FIG. 13 is a front view illustrating the light emitter unit 16 arranged in the installation portion 3D. FIG. 14 is a perspective view illustrating an opening 24A of the prop portion 24 according to the embodiment. FIG. 15 is a view of a slit 3G of the hammer housing portion 3 according to the embodiment as viewed from the lower side.

The light emitter unit 16 emits illumination light. The light emitter unit 16 illuminates the anvil 10 and the periphery of the anvil 10 with the illumination light. The light emitter unit 16 illuminates a front end side of the anvil 10 with the illumination light.

The light emitter unit 16 is arranged on the front portion of the hammer housing portion 3. The light emitter unit 16 is arranged on the front surface portion 3C of the hammer housing portion 3. The light emitter unit 16 is arranged around the front tubular portion 3B. The light emitter unit 16 is formed to surround the anvil 10. The light emitter unit 16 is arranged around the anvil shaft portion 10C via the front tubular portion 3B. In the embodiment, the light emitter unit 16 has an annular shape surrounding the anvil 10.

The light emitter unit 16 includes a plurality of light emitters 52. The light emitters 52 are light emitting diode (LED) elements. In the embodiment, the light emitter unit 16 includes a chip on board LED (COB LED) light (hereinafter, referred to as COB light 50). The COB light 50 emits light to the front end side of the anvil 10.

The COB light 50 includes a substrate 51 and the light emitters 52. Examples of the substrate 51 include an aluminum substrate, a glass cloth base epoxy resin substrate (FR-4 substrate), and a composite material epoxy resin substrate (CEM-3 substrate). The light emitters 52 are mounted on a surface of the substrate 51. The light emitters 52 and the substrate 51 are connected via a gold wire (not illustrated). The gold wire connects the plurality of light emitters 52 to each other. The light emitters 52 are surrounded by a bank. A fluorescent substance is arranged in a section space surrounded by the bank. The light emitters 52 are covered by the fluorescent substance 53. A pair of electrodes (not illustrated) is arranged on a surface (front surface) or a back surface (rear surface) of the substrate 51 on the outer side of the bank. One of the pair of electrodes is a positive electrode, and the other electrode is a negative electrode. The lead wire 60 is connected to each of the pair of electrodes. Power output from the battery pack 80 is supplied to the electrodes via the lead wire 60. The power supplied to the electrodes is supplied to the light emitters 52 via the substrate 51 and the gold wire. The light emitters 52 emit light with the power supplied from the battery pack 80. A voltage of the battery pack 80 is applied to the light emitters 52 while being stepped down to 5 V by the controller 17. The controller is housed in the battery holding portion 23. The light emitter unit 16 and the controller are connected via the lead wire 60.

The COB light 50 has an annular shape. The COB light 50 is arranged around the anvil shaft portion 10C via the front tubular portion 3B. The substrate 51 includes an annular portion 51A and a support portion 51B protruding downward from a lower portion of the annular portion 51A. The substrate 51 is provided to surround the anvil shaft portion 10C.

The light emitters 52 are arranged in the rotation direction around the anvil 10. The light emitters 52 are arranged at least partially around the anvil shaft portion 10C via the front tubular portion 3B. The light emitters 52 are mounted on a front surface of the annular portion 51A of the substrate 51. The light emitters 52 are arranged in the rotation direction. The light emitters 52 are arranged at intervals in the circumferential direction of the annular portion 51A. The number of light emitters 52 is not limited as long as being plural. In the embodiment, the 24 light emitters 52 are arranged at equal intervals in the circumferential direction of the annular portion 51A (see FIG. 13).

The fluorescent substance 53 is arranged on the front surface of annular portion 51A of the substrate 51. The fluorescent substance 53 is continuous to cover the surfaces of the light emitters 52 and a region between the light emitters 52. The fluorescent substance 53 has an annular shape. The fluorescent substance 53 is arranged to cover each of the light emitters 52.

The light emitter unit 16 includes an optical member 55.

The optical member 55 is connected to the COB light 50. The optical member 55 is fixed to the substrate 51. The optical member 55 is made of a polycarbonate resin. In the embodiment, the optical member 55 is made of a polycarbonate resin including a white diffusion material. The optical member 55 is milky white. The optical member 55 transmits at least a part of the light emitted from the COB light 50. The light transmittance of the optical member 55 is, for example, 40% or more and 70% or less. The optical member 55 diffuses the light emitted from the plurality of light emitters 52.

The optical member 55 is arranged to cover the front side of the light emitters 52. At least a part of optical member 55 is arranged on the front side of the COB light 50. The optical member 55 is continuous across the light emitters 52. The optical member 55 has an annular shape. The optical member 55 includes an outer tubular portion 55A, an inner tubular portion 55B, a light transmission portion 55C, and a protrusion portion 55D.

The outer tubular portion 55A is arranged radially outside the inner tubular portion 55B. The outer tubular portion 55A is arranged on the outer peripheral side of the COB light 50. The outer tubular portion 55A is arranged radially outside the light emitters 52. In the radial direction, the COB light 50 is arranged between the outer tubular portion 55A and the inner tubular portion 55B. The outer tubular portion 55A is arranged radially outside the annular portion 51A of the substrate 51. The inner tubular portion 55B is arranged on the inner peripheral side of the COB light 50. The inner tubular portion 55B is arranged radially inside the annular portion 51A of the substrate 51. The inner tubular portion 55B is arranged radially inside the light emitters 52.

The light transmission portion 55C is arranged on the front side of the COB light 50. The light transmission portion 55C has an annular shape. The light transmission portion 55C is arranged on the front side of the light emitters 52. The light transmission portion 55C is arranged to connect a front end portion of the outer tubular portion 55A and a front end portion of the inner tubular portion 55B. The light transmission portion 55C faces the front surface of the annular portion 51A. The light transmission portion 55C faces the light emitters 52. The light emitted from the light emitters 52 passes through the light transmission portion 55C and is emitted to the front side of the light emitter unit 16. A front surface of the light transmission portion 55C forms a front surface 16A of the light emitter unit 16.

The protrusion portion 55D is arranged below the light transmission portion 55C. The protrusion portion 55D is provided to protrude downward from a lower portion of the outer tubular portion 55A. As illustrated in FIG. 11, a housing space is formed on a rear surface of the protrusion portion 55D. The support portion 51B of the substrate 51 is arranged in the housing space formed on the rear surface of the protrusion portion 55D. The protrusion portion 55D covers and protects the front side of the lead wire 60 passing through the rear side of the substrate 51. The protrusion portion 55D functions as a positioning portion of the light emitter unit 16 in the rotation direction by being arranged in the slit 3G of the hammer housing portion 3 (described later).

A rear surface of the substrate 51 is arranged on the front side of a rear end portion of the outer tubular portion 55A and a rear end portion of the inner tubular portion 55B. The rear surface of the substrate 51 and at least a part of an inner peripheral surface of the outer tubular portion 55A are fixed with an adhesive. The rear surface of the substrate 51 and at least a part of the outer peripheral surface of the inner tubular portion 55B are fixed with an adhesive. The COB light 50 and the optical member 55 are fixed to each other.

The hammer housing portion 3 supports the light emitter unit 16 on the front surface portion 3C. The hammer housing portion 3 has the installation portion 3D that houses the light emitter unit 16. The installation portion 3D is arranged on the front surface portion 3C of the hammer housing portion 3. The installation portion 3D is arranged between the front tubular portion 3B and an outer periphery of the front surface portion 3C. The installation portion 3D is formed integrally with the hammer housing portion 3. The installation portion 3D is provided circumferentially along an outer periphery of the front tubular portion 3B. In the embodiment, the installation portion 3D is annular and recessed. The light emitter unit 16 is housed in the annular and recessed installation portion 3D. The installation portion 3D houses at least a part of the light emitter unit 16. The installation portion 3D may not be a completely continuous annular shape, and may be partially discontinuous. A part of the light emitter unit 16 may be arranged outside the installation portion 3D. At least a part of the light emitter unit 16 is arranged between an outer peripheral surface 3E of the hammer housing portion 3 and the front tubular portion 3B.

The hammer housing portion 3 has a wall portion 3F that surrounds an outer periphery of the light emitter unit 16. The wall portion 3F protrudes forward from the front surface portion 3C of the hammer housing portion 3. The wall portion 3F is provided circumferentially along an outer peripheral edge of the front surface portion 3C of the hammer housing portion 3. The wall portion 3F has a substantially annular shape, and a portion of the slit 3G is cut out. The wall portion 3F surrounds an entire circumference of the light emitter unit 16 except for a portion of the protrusion portion 55D of the light emitter unit 16.

The wall portion 3F defines an outer periphery of the installation portion 3D. The front tubular portion 3B defines an inner periphery of the installation portion 3D. The wall portion 3F and the front tubular portion 3B protrude forward from the front surface portion 3C, whereby the recessed installation portion 3D is defined. A region of the front surface portion 3C between the front tubular portion 3B and the wall portion 3F forms a bottom surface of the installation portion 3D. At least a part of the light emitter unit 16 is arranged between the wall portion 3F and the front tubular portion 3B. The entire light emitter unit 16 except for the portion of the protrusion portion 55D is arranged between the wall portion 3F and the front tubular portion 3B.

The wall portion 3F extends to the same position as the front surface 16A of the light emitter unit 16 or ahead of the front surface 16A of the light emitter unit 16. In the embodiment, the wall portion 3F protrudes slightly ahead of the front surface 16A of the light emitter unit 16. The front tubular portion 3B on the inner peripheral side of the light emitter unit 16 also extends ahead of the front surface 16A of the light emitter unit 16. The front tubular portion 3B extends ahead of the wall portion 3F.

The COB light 50 is arranged inside the installation portion 3D. At least a part of the optical member 55 is arranged inside the installation portion 3D. The light transmission portion 55C is arranged inside the installation portion 3D. The outer tubular portion 55A and the inner tubular portion 55B are arranged inside the installation portion 3D.

The front tubular portion 3B is provided with a snap ring groove 3J. The snap ring groove 3J is provided on the front side of the front surface 16A of the light emitter unit 16. A snap ring 56 is arranged in the snap ring groove 3J. The snap ring 56 functions as a retainer to prevent the light emitter unit 16 from coming off to the front side. The snap ring 56 supports the optical member 55 from the front side.

The wall portion 3F has the slit 3G through which the lead wire 60 passes. As illustrated in FIG. 14, the prop portion 24 is arranged directly below the front surface portion 3C of the hammer housing portion 3. A lower portion of the wall portion 3F faces the prop portion 24 in the up-down direction. The slit 3G is provided in a portion of the wall portion 3F which portion faces the prop portion 24. The slit 3G penetrates an inner peripheral surface and an outer peripheral surface of the wall portion 3F in the radial direction. In the embodiment, the slit 3G is a notch formed from a front end to a rear end of the wall portion 3F. The slit 3G may be a through hole penetrating between the front end and the rear end of the wall portion 3F in a window shape.

The prop portion 24 has an upper end surface 24B curved along the outer peripheral surface of the wall portion 3F. In the upper end surface 24B, an opening 24A is formed at a position facing the slit 3G. The opening 24A communicates with an internal space of the prop portion 24. The installation portion 3D on the inner peripheral side of the wall portion 3F and the internal space of the prop portion 24 face each other via the slit 3G and the opening 24A. Thus, the slit 3G connects the light emitter unit 16 and the inside of the prop portion 24. As illustrated in FIG. 12 and FIG. 13, in the light emitter unit 16, the protrusion portion 55D of the optical member 55 and the support portion 51B of the substrate 51 are arranged inside the slit 3G.

A buffer member 57 is arranged between the hammer housing portion 3 and the light emitter unit 16. The buffer member 57 is arranged behind the COB light 50. The buffer member 57 is an elastic body and is made of, for example, a rubber material. The buffer member 57 has a light blocking property. The buffer member 57 is black. The buffer member 57 protects the substrate 51 and the optical member 55 made of a resin material from contact with the hammer housing portion 3 that is a metal vibrating body. The buffer member 57 covers a rear surface of the light emitter unit 16 and at least one of an inner peripheral surface of the light emitter unit 16 or the outer peripheral surface 3E. In the embodiment, the buffer member 57 covers the rear surface of the light emitter unit 16 and the inner peripheral surface of the light emitter unit 16.

The buffer member 57 includes a bottom plate portion 57A, inner peripheral wall portions 57B, and a protruded portion 57C.

The bottom plate portion 57A covers the rear surface of the light emitter unit 16. The bottom plate portion 57A is flat and annular. The bottom plate portion 57A is installed on the bottom surface of the installation portion 3D. A rear surface of the bottom plate portion 57A is in contact with the bottom surface of the installation portion 3D. A front surface of the bottom plate portion 57A is in contact with a rear surface of the optical member 55. Specifically, the rear surface of the optical member 55 is a rear surface of the outer tubular portion 55A and a rear surface of the inner tubular portion 55B. The bottom plate portion 57A is spaced rearward from the substrate 51 of the light emitter unit 16. An inner periphery of the bottom plate portion 57A is in contact with the front tubular portion 3B of the hammer housing portion 3. An outer periphery of the bottom plate portion 57A is in contact with the wall portion 3F of the hammer housing portion 3. The bottom plate portion 57A covers substantially the entire bottom surface of the installation portion 3D.

The inner peripheral wall portions 57B cover the inner peripheral surface of the light emitter unit 16. Each of the inner peripheral wall portions 57B protrudes forward from an inner peripheral edge of the bottom plate portion 57A. The inner peripheral wall portions 57B extend circumferentially along the inner peripheral edge of the bottom plate portion 57A. An inner peripheral surface of each of the inner peripheral wall portions 57B is in contact with the front tubular portion 3B of the hammer housing portion 3. An outer peripheral surface of each of the inner peripheral wall portions 57B is in contact with the inner tubular portion 55B of the optical member 55. The inner tubular portion 55B is fitted to an outer periphery of each of the inner peripheral wall portions 57B, whereby the optical member 55 is fixed to the front tubular portion 3B via the inner peripheral wall portions 57B. This prevents positional displacement of the light emitter unit 16 in the radial direction (up-down direction and left-right direction).

Four inner peripheral wall portions 57B are provided at equal angular intervals in the rotation direction. Recess portions 57D are formed by gaps between the four inner peripheral wall portions 57B. The four recess portions 57D are provided by gaps between the adjacent inner peripheral wall portions 57B. In the recess portions 57D, ribs 55E provided in the inner tubular portion 55B of the optical member 55 are arranged. Engagement of the recess portions 57D and the ribs 55E prevents positional displacement of the light emitter unit 16 in the rotational direction. A thickness of the inner peripheral wall portion 57B is larger than a protrusion amount of the rib 55E from the inner tubular portion 55B. Thus, the ribs 55E are arranged on the outer side of the inner peripheral surfaces of the inner peripheral wall portions 57B and are separated from the front tubular portion 3B of the hammer housing portion 3.

The protruded portion 57C protrudes downward from the lower portion of the bottom plate portion 57A. As illustrated in FIG. 12, the protruded portion 57C is arranged inside the slit 3G of the wall portion 3F. In the slit 3G, the protruded portion 57C is arranged between the rear surface of the light emitter unit 16 and the front surface portion 3C of the hammer housing portion 3. In the slit 3G, the protruded portion 57C covers the front surface portion 3C of the hammer housing portion 3. The protruded portion 57C has a flat plate shape along the front surface portion 3C. A rear surface of the protruded portion 57C is in contact with the front surface portion 3C.

A pair of protrusions 57E is formed at both ends in the left-right direction of the protruded portion 57C. The protrusions 57E protrude forward from the protruded portion 57C. Each of the protrusions 57E is in contact with an end surface of the wall portion 3F (inner surface of the slit 3G) in the left-right direction inside the slit 3G. The protrusions 57E are arranged at an interval. The protrusion portion 55D of the optical member 55 is arranged between the protrusions 57E. The protrusions 57E are respectively in contact with side surfaces of the protrusion portion 55D of the optical member 55. The light emitter unit 16 is sandwiched from the left and right by the pair of protrusions 57E of the buffer member 57 at the portion of the protrusion portion 55D. The pair of protrusions 57E is sandwiched between the protrusion portion 55D of the light emitter unit 16 and the wall portion 3F of the hammer housing portion 3 inside the slit 3G. Thus, even when the hammer housing portion 3 vibrates, contact with the hammer housing portion 3 is avoided by the buffer member 57.

With such a configuration, the light emitter unit 16 is held in the hammer housing portion 3 via the buffer member 57 in the installation portion 3D without contacting the hammer housing portion 3. Even in a case where the hammer 47 collides with the anvil 10 and the hammer housing portion 3 vibrates, the buffer member 57 prevents the light emitter unit 16 from directly coming into contact with the hammer housing portion 3.

In addition, as illustrated in FIG. 15, the impact tool 1 includes a guide portion GD that guides the lead wire 60 to pass through the slit 3G without contacting the hammer housing portion 3. The guide portion GD is formed by a passage portion surrounded by the buffer member 57 and the protrusion portion 55D inside the slit 3G.

As described above, a rear side of the slit 3G is defined by the front surface portion 3C of the hammer housing portion 3, left and right sides are defined by the end surfaces of the wall portion 3F, and a front side is opened. The buffer member 57 covers the front surface portion 3C with the protruded portion 57C. The buffer member 57 covers the left and right end surfaces of the wall portion 3F by the pair of protrusions 57E.

Here, the rear surface of the protrusion portion 55D of the light emitter unit 16 is arranged at a position spaced forward from the protruded portion 57C of the buffer member 57. The rear surface of the protrusion portion 55D is placed ahead of the rear surface of the outer tubular portion 55A and the rear surface of the inner tubular portion 55B. Thus, in a state in which the rear surface of the outer tubular portion 55A and the rear surface of the inner tubular portion 55B are in contact with the bottom plate portion 57A of the buffer member 57, the rear surface of the protrusion portion 55D is placed ahead of the protruded portion 57C. As a result, as illustrated in FIG. 15, when the slit 3G is viewed from the lower side to the upper side, a space is formed in which the left and right sides and the rear side are surrounded by the buffer member 57 and the front side is surrounded by the protrusion portion 55D. The lead wire 60 passes through the inside of the slit 3G without directly contacting the hammer housing portion 3 by passing through the space surrounded by the buffer member 57 and the protrusion portion 55D. Thus, in the embodiment, the buffer member 57 and the protrusion portion 55D function as the guide portion GD. Here, the buffer member 57 and a part of the optical member 55 are used as the guide portion GD. However, for example, a tubular member may be provided inside the slit 3G and used as the guide portion GD.

As illustrated in FIG. 9, the protrusion portion 55D of the light emitter unit 16 enters the inside of the prop portion 24. The lower end portion of the protrusion portion 55D passes through the slit 3G and is arranged inside the prop portion 24. The protrusion portion 55D in the opening 24A of the prop portion 24 and the upper end surface 24B (see FIG. 14) of the prop portion 24 overlap with each other within a range of a length E. Thus, the lead wire 60 is covered with the protrusion portion 55D without being exposed to the front side even in a portion of a gap between the upper end surface 24B of the prop portion 24 and the slit 3G.

The lead wire 60 passes through the inside of the prop portion 24. The lead wire 60 passes upward from the opening 24A of the upper end surface 24B of the prop portion 24 through the inside of the slit 3G of the hammer housing portion 3 (inside of the guide portion GD), and is connected to the light emitter unit 16. The lead wire 60 is connected to the electrodes on the rear surface of the substrate 51 between the light emitter unit 16 and the buffer member 57. The lead wire 60 travels downward from the opening 24A of the prop portion 24 and reaches the battery holding portion 23. The lead wire 60 is connected to the controller 17 (see FIG. 16) arranged in the battery holding portion 23. In such a manner, the lead wire 60 passes from an upper end portion to a lower end portion of the prop portion 24 and is connected to the controller 17. One end of the lead wire 60 is arranged at a position above the upper end of the prop portion 24 (front surface portion 3C of the hammer housing portion 3). The other end of the lead wire 60 is arranged at a position below the lower end of the prop portion 24 (battery holding portion 23).

First Protective Cover and Second Protective Cover

The impact tool 1 includes a first protective cover 61 and a second protective cover 62. Each of the first protective cover 61 and the second protective cover 62 covers a range including a part of the light emitter unit 16.

As illustrated in FIG. 1 to FIG. 4, the first protective cover 61 is arranged on the outer peripheral portion of the front surface portion 3C of the hammer housing portion 3. The first protective cover 61 covers: the wall portion 3F including the slit 3G; the end portion of the prop portion 24, the end portion being adjacent to the slit 3G; and an outer peripheral portion of the front surface 16A of the light emitter unit 16. Thus, the first protective cover 61 covers, from the front side, the passage path of the lead wire 60 that enters the opening 24A of the prop portion 24 from the light emitter unit 16 via the slit 3G. The first protective cover 61 has an annular shape. The first protective cover 61 covers a range including the outer peripheral edge of the front surface portion 3C of the hammer housing portion 3 over an entire circumference.

The second protective cover 62 is arranged on the inner peripheral portion of the front surface portion 3C of the hammer housing portion 3. That is, the second protective cover 62 is arranged in the portion of the front tubular portion 3B of the front surface portion 3C. The second protective cover 62 covers the front tubular portion 3B and the inner peripheral portion of the front surface 16A of the light emitter unit 16. The second protective cover 62 covers the snap ring 56 mounted on the front tubular portion 3B. The second protective cover 62 has an annular shape. The second protective cover 62 covers the front surface and a peripheral side surface of the front tubular portion 3B.

The first protective cover 61 and the second protective cover 62 are made of an elastic body such as a rubber material. The first protective cover 61 and the second protective cover 62 have a light blocking property. The first protective cover 61 and the second protective cover 62 are, for example, black. In the embodiment, the outer periphery of the front surface 16A of the light emitter unit 16 is covered with the first protective cover 61. The inner periphery of the front surface 16A of the light emitter unit 16 is covered with the second protective cover 62. An inner periphery of the first protective cover 61 and an outer periphery of the second protective cover 62 are concentric. The front surface 16A of the light emitter unit 16 is exposed to the front side in a circular annular portion between the first protective cover 61 and the second protective cover 62. This annular portion serves as an emission region of light emitted from the light emitter unit 16 to the outside. The annular portion faces the light emitters 52 in the front-rear direction. A width of the annular portion is larger than a length in the radial direction of the light emitters 52. As a result, the light emitted from the light emitter unit 16 is narrowed to a range directed forward from the annular portion.

The first protective cover 61 and the second protective cover 62 prevents contact of an obstacle with the light emitter unit 16 during use of the impact tool 1. The first protective cover 61 and the second protective cover 62 protect an external object to prevent damage occurring when the front surface portion 3C or the front tubular portion 3B of the hammer housing portion 3 made of metal collides with the external object during use of the impact tool 1. The first protective cover 61 and the second protective cover 62 prevent light leakage from the slit 3G and the protrusion portion 55D, diffusion of light to an excessive wide angle, and unnecessary surface reflection of the hammer housing portion 3 including the front tubular portion 3B, by limiting the light emission region in the front surface 16A of the light emitter unit 16 to the annular portion.

As illustrated in FIG. 6 and FIG. 8, an outer peripheral protrusion 3K extending circumferentially in a range of about 270 degrees in the circumferential direction is formed on the outer periphery of the hammer housing portion 3 behind the light emitter unit 16. The outer peripheral protrusion 3K has two functions. One is a protrusion to prevent the first protective cover 61 from coming off to the front side. The outer peripheral protrusion 3K is covered with the first protective cover 61. The first protective cover 61 has a recess portion that covers the outer peripheral protrusion 3K in an embracing manner over a front and rear of the outer peripheral protrusion 3K. The first protective cover 61 is made of an elastic body, and may be detached from the hammer housing portion 3 by extension of the elastic body. The outer peripheral protrusion 3K and the recess portion of the first protective cover 61 fitted to the outer peripheral protrusion 3K make it difficult for the first protective cover 61 to move forward.

Another function of the outer peripheral protrusion 3K is a protrusion for protecting the wall portion 3F. The wall portion 3F rises forward from the front surface portion 3C of the hammer housing portion 3, and may be broken by collision when the wall portion 3F collides with another member during use. Thus, it is effective to devise to make it difficult for the wall portion 3F to collide. The outer peripheral protrusion 3K is arranged behind the wall portion 3F. When viewed in an up-down and front-rear cross section illustrated in FIG. 6, the wall portion 3F is arranged on the lower side and the rear side of a virtual plane IL1 that can be drawn by an upper portion 3KU of the outer peripheral protrusion 3K and an upper portion of the anvil 10. When viewed in a left-right and front-rear cross section illustrated in FIG. 8, the wall portion 3F is arranged on the left side and the rear side of a virtual plane IL2 that can be drawn by a right portion 3KR of the outer peripheral protrusion 3K and a right portion of the anvil 10. Similarly, the wall portion 3F is arranged on the right side and the rear side of a virtual plane IL3 that can be drawn by a left portion 3KL of the outer peripheral protrusion 3K and a left portion of the anvil 10. As such, the wall portion 3F is formed in a manner not to protrude outward from the virtual planes IL1, IL2, and IL3. Thus, the virtual planes IL1, IL2, and IL3 are thresholds to protect the wall portion 3F, and the wall portion 3F is less likely to be broken.

Controller

Figure 16:
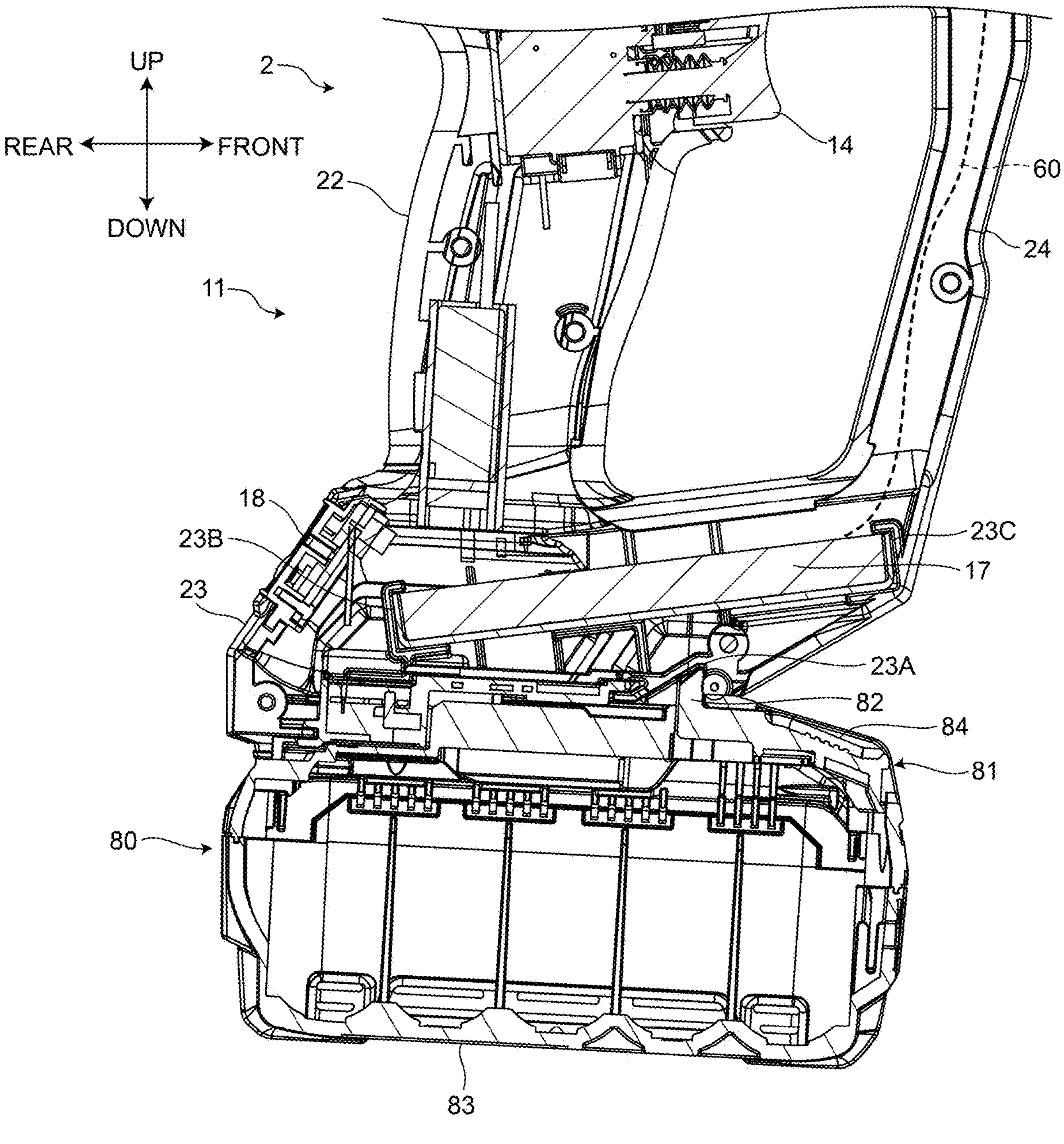
FIG. 16 is an enlarged longitudinal sectional view of a lower portion of the impact tool according to the embodiment.

FIG. 16 is an enlarged longitudinal sectional view of a lower portion of the impact tool 1 according to the embodiment. In the impact tool 1, as a model has larger maximum tightening torque, the motor 6 becomes larger, and current flowing through the coil 31 also increases. In order to cope with the increase in current, the controller 17 also tends to increase in size. When the battery holding portion 23 increases in size along with the increase in size of the controller 17, maneuverability of the impact tool 1 is decreased. Thus, it is desirable to prevent an increase in an outer dimension of the battery holding portion 23 even when the controller 17 is increased in size. Thus, in the embodiment, it is made possible to secure a large installation space in the battery holding portion 23 by inclining the controller 17 in the battery holding portion 23.

The controller 17 is arranged above the battery pack 80 inside the battery holding portion 23. The controller 17 is long in the front-rear direction. The battery holding portion 23 includes a rear holding portion 23B that holds a rear portion of the controller 17 and a front holding portion 23C that holds a front portion of the controller 17. The rear portion of controller 17 is arranged below the lower end portion of the grip portion 22 in the front-rear direction. The rear portion of the controller 17 is arranged between a rear portion of the battery pack 80 and the engagement hook portion 82 in the front-rear direction. The front portion of the controller 17 is arranged below the lower end portion of the prop portion 24 in the front-rear direction. The front portion of the controller 17 is arranged on the front side of the engagement hook portion 82 in the front-rear direction. The front portion of the controller 17 and the finger rest portion 84 are arranged vertically (overlap vertically). The engagement recess portion 23A is arranged below the front portion of the controller 17.

The controller 17 has a flat plate shape. The front portion of the controller 17 is arranged to be higher than the rear portion of the controller 17. The controller 17 is inclined obliquely upward toward the front. A lower surface of the controller 17 is inclined with respect to a lower surface 83 of the battery pack 80.

Motor Size

As described above, in the impact tool 1 of a model having large maximum tightening torque, the motor 6 becomes large. The total length of the impact tool 1 tends to increase along with the increase in size of the motor 6. As the total length of the impact tool 1 increases, the maneuverability of the impact tool 1 is decreased. Thus, in the embodiment, the total length of the motor 6 in the impact tool 1 is reduced by reduction of the length of the stator 26 in the front-rear direction while the maximum tightening torque is maintained. As the total length of the motor 6 is reduced, the increase in the total length of the impact tool 1 is prevented.

Figure 17:
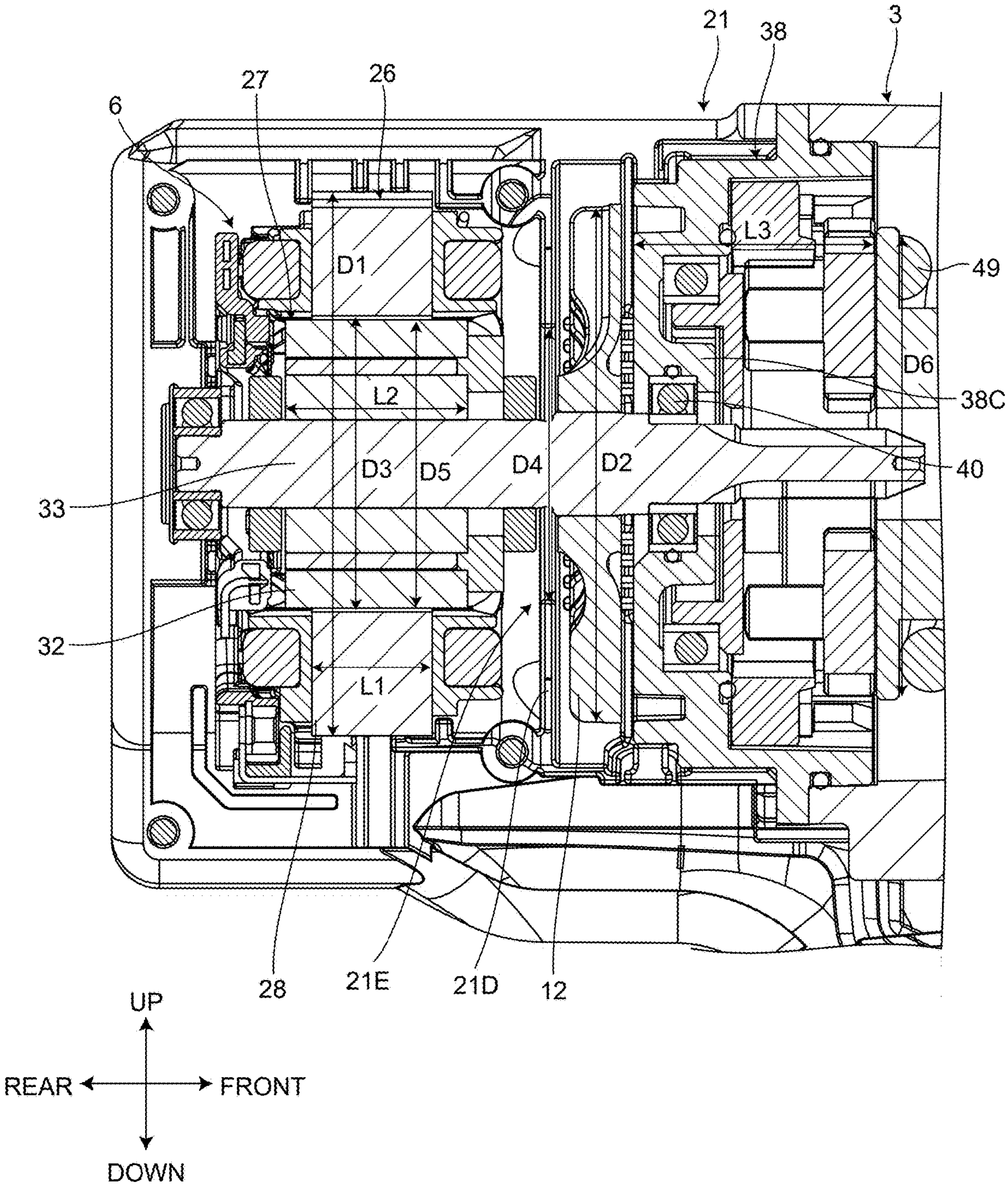
FIG. 17 is an enlarged longitudinal sectional view of a motor housing portion of the impact tool according to the embodiment.

FIG. 17 is an enlarged longitudinal sectional view of the motor housing portion 21 of the impact tool 1 according to the embodiment. The stator core 28 has a length L1 and an outer diameter D1. The outer diameter D1 is three times or more of the length L1. By utilization of the large-diameter stator core 28, the length of the stator 26 is reduced with performance being maintained. The length L1 of the stator core 28 is smaller than a length L3 of the gear case 38. The outer diameter D1 of the stator core 28 is larger than an outer diameter D6 of the coil spring 49. The outer diameter D1 of the stator core 28 is larger than an outer diameter D2 of the fan 12. An outer periphery of the stator core 28 is arranged radially outside an outer periphery of the fan 12. The motor 6 and the fan 12 are divided by a partition wall 21D. An opening 21E serving as an air passage is formed in the partition wall 21D. An inner diameter D3 of the stator core 28 is larger than an inner diameter D4 of the opening 21E. An inner periphery of the stator core 28 is arranged radially outside the opening 21E. The opening 21E faces an end surface of the rotor core portion 32 in the front-rear direction.

The rotor core portion 32 has a length L2 and an outer diameter D5. The outer diameter D5 is larger than the length L2. An outer periphery of the rotor core portion 32 is arranged radially outside the holding tubular portion 38C of the gear case 38. The length L2 of the rotor core portion 32 is smaller than the length L3 of the gear case 38.

An example of specific dimensions in the present embodiment will be described. As illustrated in FIG. 6, the total length of the impact tool 1 is represented by a length L11+a length L12+a length L13. The length L11 is a length from a front surface of the anvil 10 to a front surface of the gear case 38. The length L12 is a length from the front surface of the gear case 38 to a rear surface of the gear case 38. The length L13 is a length from the rear surface of the gear case 38 to a rear surface of the motor housing portion 21. The length L11 is 163.2 mm. The length L12 is 30.3 mm. The length L13 is 65.1 mm. The total length of the impact tool 1 is 258.6 mm. In this configuration, the outer diameter D1 of the stator core 28 is 68 mm. The length L1 of the stator core 28 is 15 mm.

The reduction in the length L1 of the stator core 28 specifically contributes to reduction in the length L13 from the rear surface of the gear case 38 to the rear surface of the motor housing portion 21. In the present embodiment, a condition that a dimensional ratio R1 obtained by division of the length (L11+L12) from the front surface of the anvil 10 to the rear surface of the gear case 38 by the length L13 from the rear surface of the gear case 38 to the rear surface of the motor housing portion 21 is 2.6 or more is satisfied. The dimensional ratio R1 is expressed by the following expression.

$$R1=(L11+L12)/L13$$

The dimensional ratio R1 is preferably 2.75 or more, and more preferably 2.9 or more. In addition, the dimensional ratio R1 is preferably 8.9 or less. In a case of the above-described size example, the dimensional ratio R1 is 2.97.

In addition, in the present embodiment, a condition that a dimensional ratio R2 obtained by division of the length (L11+L12) from the front surface of the anvil 10 to the rear surface of the gear case 38 by the length L1 of the stator core 28 is 7.0 or more is satisfied. The dimensional ratio R2 is expressed by the following expression.

$$R2=(L11+L12)/L1$$

The dimensional ratio R2 is preferably 9.5 or more, and more preferably 12.0 or more. In addition, the dimensional ratio R2 is preferably 38.7 or less. In a case of the above-described size example, the dimensional ratio R2 is 12.9.

The dimensional ratio R1 and the dimensional ratio R2 indicate that as a value thereof increases, a ratio of a length dimension occupied by the motor housing portion 21 and the stator 26 in the total length of the impact tool 1 decreases. Thus, by the configuration in the above manner, the total length of the impact tool 1 can be effectively reduced.

Side Handle

Figure 18:
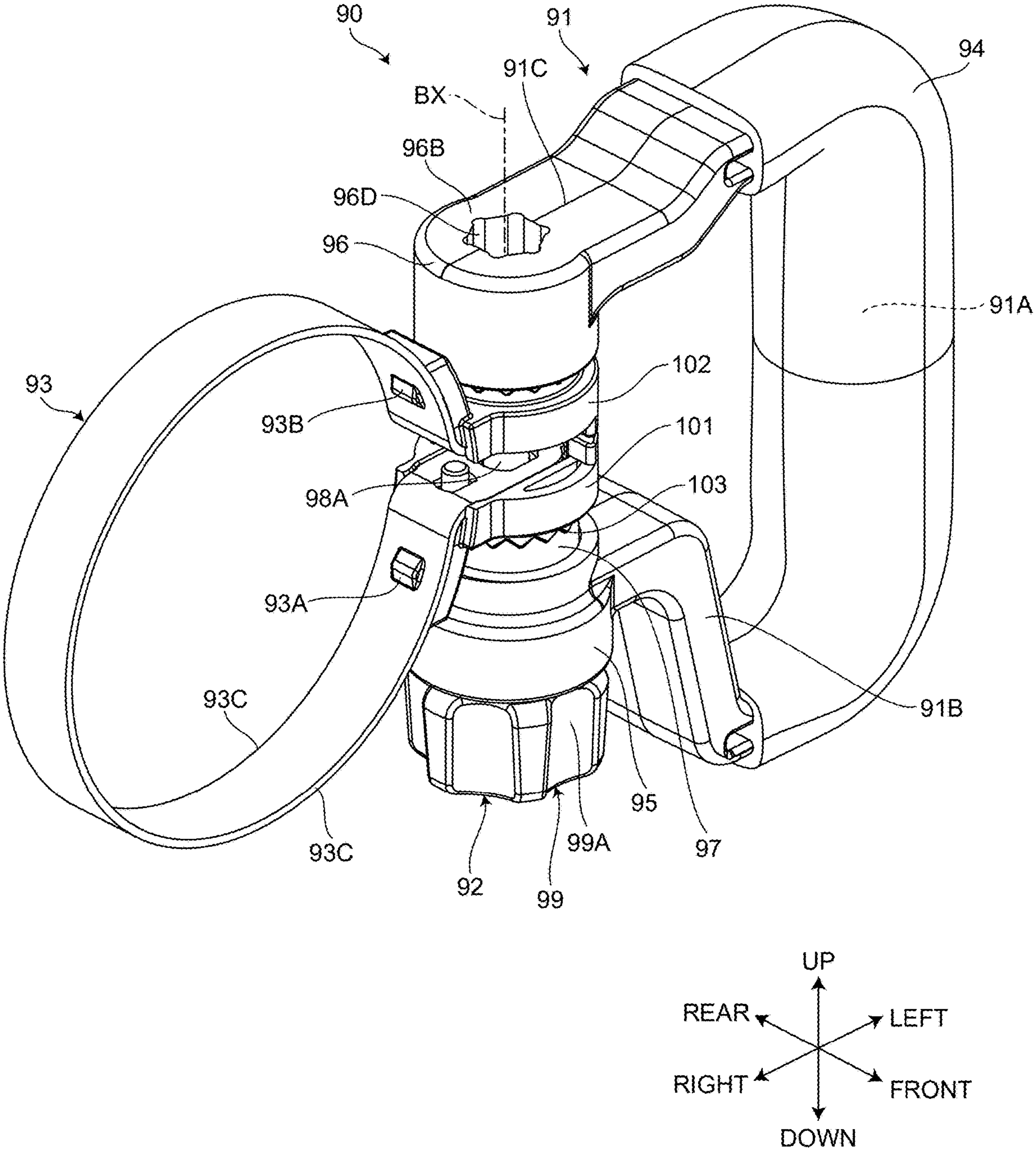
FIG. 18 is a perspective view illustrating a side handle according to the embodiment.
Figure 19:
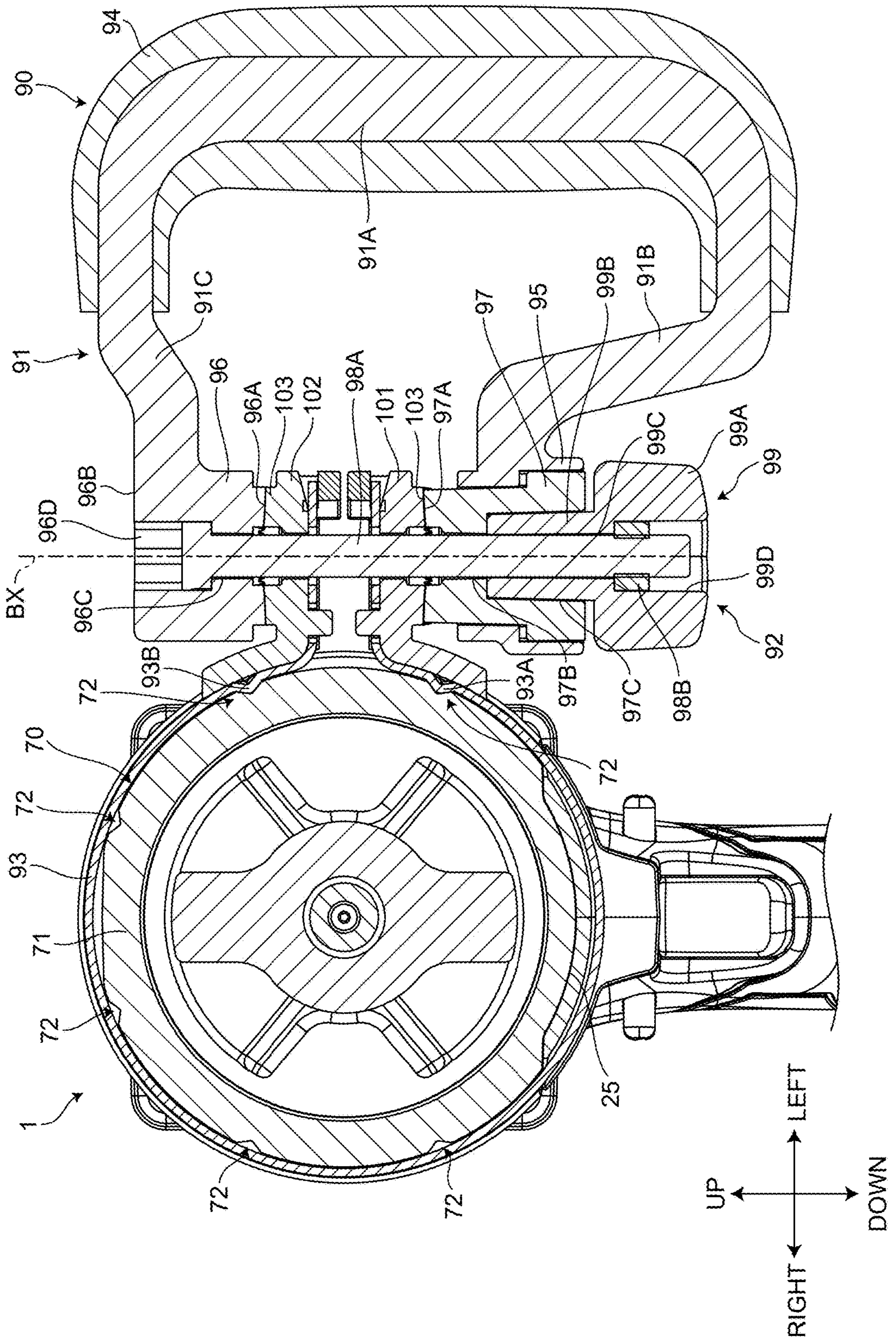
FIG. 19 is a cross-sectional view of a cross section passing through a mounted portion of the side handle according to the embodiment as viewed from a front side.
Figure 20:
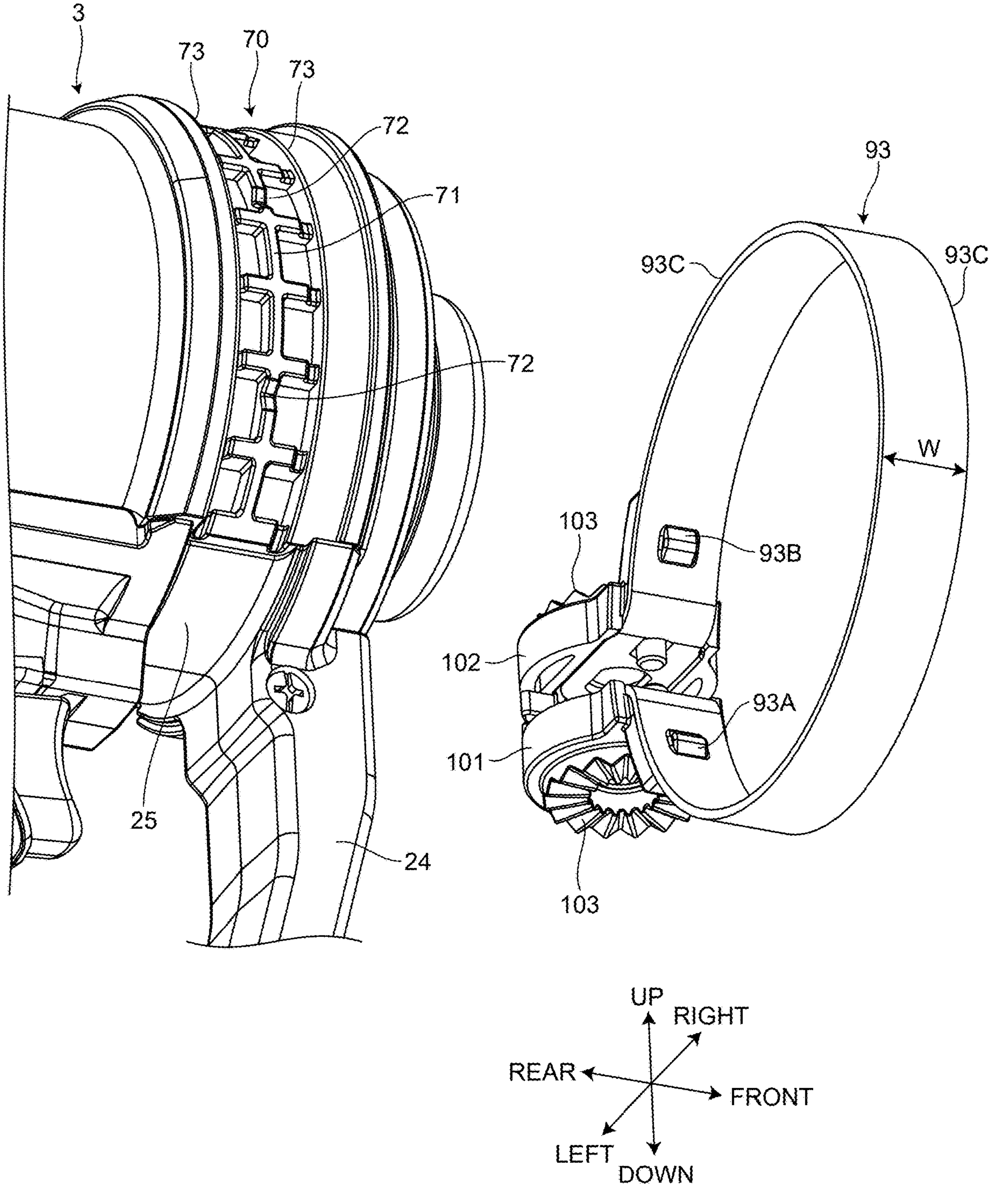
FIG. 20 is a perspective view illustrating a band mounted portion according to the embodiment.

FIG. 18 is a perspective view illustrating a side handle 90 according to the embodiment. FIG. 19 is a cross-sectional view of a cross section passing through a mounted portion of the side handle 90 according to the embodiment as viewed from the front side. FIG. 20 is a perspective view illustrating a band mounted portion 70 according to the embodiment.

In the impact tool 1, the side handle 90 is detachably attached. The side handle 90 includes a handle base 91, a fastening mechanism 92 provided on the handle base 91, and a band 93 that fastens the impact tool 1. The side handle 90 is detachably fixed to the impact tool 1 by fastening of the band 93 surrounding a predetermined position of the impact tool 1 by the fastening mechanism 92. In FIG. 1 to FIG. 4, a state in which only the band 93 of the side handle 90 is mounted on the impact tool 1 is illustrated, and illustration of the handle base 91 and the fastening mechanism 92 is omitted for the sake of convenience.

As illustrated in FIG. 1 to FIG. 3 and FIG. 20, the impact tool 1 includes a band mounted portion 70 to which the band 93 of the side handle 90 is attached. The band mounted portion 70 is provided in the circumferential direction along the outer periphery of the hammer housing portion 3. The band mounted portion 70 is provided in a manner to pass through an inside of the annular handle portion 11. The band mounted portion 70 is arranged on the front side of the grip portion 22. The band mounted portion 70 is arranged behind the prop portion 24. The band mounted portion 70 is arranged in the connection portion 25. In such a manner, the band mounted portion 70 is provided across the hammer housing portion 3 and the housing 2 (connection portion 25). The side handle 90 can be attached to/detached from the hammer housing portion 3. The hammer housing portion 3 and the housing 2 (connection portion 25) are surrounded and fastened with the band 93, whereby the side handle 90 is fixed to the impact tool 1. When the side handle 90 is mounted, the light emitter unit 16 is arranged on the front side of the side handle 90.

As illustrated in FIG. 18 and FIG. 19, the handle base 91 includes a columnar portion 91A, a first arm 91B, and a second arm 91C. The handle base 91 is made of resin. The first arm 91B extends in a lateral direction from one end of the columnar portion 91A. The second arm 91C extends from the other end of the columnar portion 91A in the same direction as the first arm 91B. The first arm 91B and the second arm 91C are bent in directions approaching each other. The handle base 91 has a C-shape by the columnar portion 91A, the first arm 91B, and the second arm 91C. The columnar portion 91A is provided with a handle grip 94 made of resin. The handle grip 94 is a tubular member surrounding a periphery of the columnar portion 91A, and is held by a hand of the operator. The handle base 91 holds the fastening mechanism 92 and the band 93. The handle base 91 holds the fastening mechanism 92 by the first arm 91B and the second arm 91C. A first holding portion 95 is provided at a tip of the first arm 91B. A second holding portion 96 is provided at a tip of the second arm 91C.

The first holding portion 95 has a cylindrical shape. An inner diameter of an inner opening of the first holding portion 95, which opening faces the second holding portion 96, is narrowed stepwise such that the inner diameter is smaller than an inner diameter of an outer opening facing a direction opposite to the second holding portion 96. The first holding portion 95 holds a cam member 97. The cam member 97 has a cylindrical shape, and an outer peripheral surface thereof is narrowed stepwise in accordance with an inner surface of the first holding portion 95. The cam member 97 is inserted into the first holding portion 95 from the outer opening of the first holding portion 95, and engages with a stepped portion on the inner surface of the first holding portion 95. The cam member 97 is movable inside the first holding portion 95 along a central axis BX of the bolt 98A in a range from the outer opening to the stepped portion. The cam member 97 has a cam engagement surface 97A facing the second holding portion 96. The cam engagement surface 97A is an engagement surface of an uneven pattern. The cam member 97 has an insertion hole 97B through which a shaft portion of the bolt 98A is inserted. The cam member 97 has a recessed portion 97C. The recessed portion 97C is formed in an outer surface of the cam member 97 which surface faces the direction opposite to the second holding portion 96, and is recessed toward the second holding portion 96.

The second holding portion 96 has an inner surface 96A facing the first holding portion 95, an outer surface 96B facing a direction opposite to the first holding portion 95, and an insertion hole 96C through which the shaft portion of the bolt 98A passes. The inner surface 96A is an engagement surface of an uneven pattern. The outer surface 96B is provided with a recessed bolt holding portion 96D that houses a head portion of the bolt 98A. An inner diameter of the bolt holding portion 96D is larger than an inner diameter of the insertion hole 96C. The bolt holding portion 96D has an inner surface shape corresponding to a shape of a tool hook of the head portion of the bolt 98A, and is engaged with the bolt 98A. As a result, the bolt 98A is held in the bolt holding portion 96D in a non-rotatable manner.

The fastening mechanism 92 includes the bolt 98A, a nut 98B, the cam member 97, and a fastening knob 99. The bolt 98A is across the first holding portion 95 and the second holding portion 96. The bolt 98A penetrates the cam member 97 from the outer surface 96B of the second holding portion 96 through the insertion hole 96C and the insertion hole 97B. The bolt 98A is held by the second holding portion 96 by the head portion of the bolt 98A being supported by a bottom surface of the bolt holding portion 96D of the second holding portion 96.

The fastening knob 99 is arranged on the first holding portion 95. The fastening knob 99 includes a held portion 99A and a protrusion portion 99B protruding from the held portion 99A toward the cam member 97. The fastening knob 99 includes an insertion hole 99C penetrating the held portion 99A and the protrusion portion 99B, and a recessed nut holding portion 99D formed in the held portion 99A. The protrusion portion 99B is arranged inside the recessed portion 97C of the cam member 97. A tip portion of the protrusion portion 99B is in contact with an inner bottom surface of the recessed portion 97C.

A tip portion of the bolt 98A penetrates the insertion hole 99C and reaches the inside of the nut holding portion 99D. An inner diameter of the nut holding portion 99D is larger than an inner diameter of the insertion hole 99C. The nut holding portion 99D houses the nut 98B. The nut holding portion 99D has an inner surface shape corresponding to a shape of a tool hook of the nut 98B, and is engaged with the nut 98B. Thus, the fastening knob 99 and the nut 98B rotate together. The nut 98B meshes with a screw portion of the bolt 98A inside the nut holding portion 99D.

The band 93 is a C-shaped belt-shaped member. The band 93 is made of metal. A first mounted portion 101 and a second mounted portion 102 are respectively provided at one end and the other end of the band 93. The first mounted portion 101 and the second mounted portion 102 are made of resin. The first mounted portion 101 and the second mounted portion 102 are annular, and are penetrated by the bolt 98A. The first mounted portion 101 faces the cam engagement surface 97A of the cam member 97. The first mounted portion 101 has an engagement surface 103 of an uneven pattern, and is engaged with the cam engagement surface 97A. The second mounted portion 102 faces the inner surface 96A of the second holding portion 96. The second mounted portion 102 has an engagement surface 103 of an uneven pattern, and is engaged with the inner surface 96A of the second holding portion 96. The engagement surfaces 103 are engaged with the cam engagement surface 97A and the inner surface 96A in the rotation direction around the central axis BX of the bolt 98A. A relative angle of the band 93 with respect to the handle base 91 in the rotation direction around the central axis BX is fixed by the engagement surface 103.

The band 93 is held by the handle base 91 by insertion of the bolt 98A into the first mounted portion 101 and the second mounted portion 102. Since the C-shaped band 93 is connected to the bolt 98A at the portions of the first mounted portion 101 and the second mounted portion 102 at both ends, the band 93 has an annular shape substantially surrounding an entire circumference of the band mounted portion 70.

A protrusion 93A and a protrusion 93B are provided on an inner peripheral surface of the band 93. The protrusion 93A and the protrusion 93B have a V-shaped protruded shape. The protrusion 93A is arranged near the first mounted portion 101 of the band 93. The protrusion 93B is arranged near the second mounted portion 102 of the band 93. The protrusion 93A and the protrusion 93B are meshed and engaged with respective recess portions 72 of the hammer housing portion 3.

Specifically, as illustrated in FIG. 20, a support rib 71 in contact with the inner peripheral surface of the band 93 is formed in the band mounted portion 70 of the hammer housing portion 3. The recess portions 72 are formed at predetermined positions of the support rib 71. Each of the recess portions 72 has a recessed shape corresponding to the protrusion 93A and the protrusion 93B. In the embodiment, the recess portions 72 is V-shaped recessed portions. When the protrusion 93A and the protrusion 93B are engaged with the recess portions 72, displacement of the band 93 in the rotation direction is controlled.

The recess portions 72 are provided in the rotation direction along the outer periphery of the hammer housing portion 3. By engagement of the protrusion 93A and the protrusion 93B with any of the recess portions 72, a mounting direction of the side handle 90 can be changed. The side handle 90 can be mounted, for example, in a direction of 90 degrees or 180 degrees in the rotation direction with respect to the grip portion 22. In the embodiment, the mounting direction in the recess portions 72 can be changed at intervals of 45 degrees along the outer periphery of the hammer housing portion 3. The handle portion 11 of the side handle 90 is arranged in the left direction or the right direction with respect to the hammer housing portion 3 in a case of being mounted in a direction of 90 degrees to the left or the right with respect to the grip portion 22. The handle portion 11 of the side handle 90 is arranged in the upward direction with respect to the hammer housing portion 3 in a case of being mounted in a direction of 180 degrees with respect to the grip portion 22. The handle portion 11 of the side handle 90 is arranged in a direction obliquely upward to the left or obliquely upward to the right with respect to the hammer housing portion 3 in a case of being mounted in a direction of 135 degrees to the left or the right with respect to the grip portion 22.

The protrusions (protrusion 93A and protrusion 93B) and the recess portions 72 may not be provided. In this case, the displacement in the rotation direction is controlled by friction between the band 93 and the band mounted portion 70 based on clamping force by the band 93.

The band 93 has a width W. A pair of locking ribs 73 is formed on the outer peripheral surface of the hammer housing portion 3. The locking ribs 73 are respectively provided on both sides of the band mounted portion 70 in the front-rear direction. In other words, the band mounted portion 70 is provided in a groove shape between the locking ribs 73. An interval between the locking ribs 73 is slightly larger than the width W of the band 93. Each of the pair of locking ribs 73 faces the band 93, which is arranged on the band mounted portion 70, in the front-rear direction. When the band 93 is displaced in the front-rear direction, the locking ribs 73 comes into contact with the end surfaces 93C in the width direction of the band 93. The pair of locking ribs 73 prevents positional displacement of the band 93 in the front-rear direction. The locking ribs 73 extend in the circumferential direction of the hammer housing portion 3. The pair of locking ribs 73 is continuous over the entire position in which the band mounted portion 70 is formed in the hammer housing portion 3.

At the time of mounting of the side handle 90, the operator rotates the fastening knob 99 in a loosening direction, releases the engagement between the nut 98B and the bolt 98A, and pulls out the bolt 98A. As a result, the band 93 and the handle base 91 are separated. The operator causes the one end of the band 93 to pass through the inside of the annular handle portion 11 of the impact tool 1, and arranges the band 93 to surround a periphery of the band mounted portion 70. In a state in which the band 93 is arranged around the band mounted portion 70, the operator attaches the bolt 98A to pass through the second holding portion 96, the second mounted portion 102, the first mounted portion 101, the cam member 97, and the fastening knob 99, and meshing with the nut 98B of the fastening knob 98 is performed. The operator rotates the fastening knob 99 in the fastening direction, and moves the nut 98B along the central axis BX of the bolt 98A. Along with the movement of the nut 98B, the fastening knob 99 moves in a direction of approaching the second holding portion 96. Along with the movement of the fastening knob 99, the cam member 97 approaches the second holding portion 96 along the central axis BX of the bolt 98A. The first mounted portion 101 pushed by the cam member 97 approaches the second holding portion 96 along the central axis BX of the bolt 98A. As a result, an interval between the first mounted portion 101 and the second mounted portion 102 is reduced, and an inner diameter of the band 93 is reduced. By reduction of the inner diameter of the band 93, the band 93 fastens the hammer housing portion 3 and the connection portion 25 at a portion of the band mounted portion 70. The side handle 90 is fixed to the impact tool 1 by the clamping force of the band 93. In a case where the side handle 90 is detached, the bolt 98A is removed by rotation of the fastening knob 99 in the loosening direction similarly to the time of the mounting.

In the embodiment, the cam member 97 is made close to the second holding portion 96 by the fastening knob 99, whereby the interval between the first mounted portion 101 and the second mounted portion 102 of the band 93 is reduced. Alternatively, the interval between the first mounted portion 101 and the second mounted portion 102 of the band 93 may be reduced by the first holding portion 95 of the handle base 91 being made close to the second holding portion 96. For example, a structure similar to the cam engagement surface 97A, the insertion hole 97B, and the recessed portion 97C is provided in the first holding portion 95 instead of the cam member 97, and the first holding portion 95 is pressed by the fastening knob 99 by the clamping force of the bolt 98A. As a result, the handle base 91 may be elastically deformed and the interval between the first holding portion 95 and the second holding portion 96 may be reduced. Still alternatively, a cam member having a structure similar to that of the cam member 97 provided in the first holding portion 95 may also be provided in the second holding portion 96, and each of the first mounted portion 101 and the second mounted portion 102 may be sandwiched via the cam member. An elastic body such as a coil spring may be arranged between the fastening knob 99 and the cam member.

Usage

When the trigger lever 14 is operated by the operator, the motor 6 is activated, and light is emitted from the light emitters 52 of the light emitter unit 16. The luminous intensity of the light emitted from the light emitter unit 16 is high, and a work object can be brightly illuminated. Even when the side handle 90 is mounted, the light emitter unit 16 is arranged on the front side of the side handle 90. The light emitted from the light emitter unit 16 is not blocked by the side handle 90.

On the other hand, in a case where a part of the light emitted from the light emitters 52 is diffused more than necessary, the operator may feel glare, and it may become difficult to visually recognize the work object. In the embodiment, light emitted from an outer peripheral surface of the outer tubular portion 55A of the optical member 55 is blocked by the wall portion 3F. The front surface 16A of the light emitter unit 16 is partially covered with the first protective cover 61 and the second protective cover 62, whereby the light emission region is limited. As a result, the glare felt by the operator is controlled.

Furthermore, for example, even when the impact tool 1 falls, the light emitter unit 16 is protected by the wall portion 3F of the hammer housing portion 3. As a result, damage to the light emitter unit 16 is prevented, and deterioration in light emission performance of the light emitter unit 16 is prevented.

In addition, as the maximum tightening torque of the impact tool 1 increases, weight of the hammer housing portion 3 increases in order to increase the inertial force at the time of collision by the hammer. As the weight of the hammer housing portion 3 increases, the impact on the handle portion 11 at the time of the fall also increases. In the embodiment, the handle portion 11 below the hammer housing portion 3 has high mechanical strength due to the annular structure constituted by the grip portion 22, the prop portion 24, the battery holding portion 23, and the connection portion 25. As a result, even when the impact tool 1 falls, the damage of the handle portion 11 is prevented.

A value of the maximum tightening torque of the impact tool 1 is not specifically limited. The maximum tightening torque of the impact tool 1 is, for example, 1800 N·m or more. More specifically, the maximum tightening torque of the impact tool 1 according to the embodiment is 2100 Nom or more and 2300 N·m or less. The maximum tightening torque is torque of when a material to be fastened is fastened, and generally means torque measured with a re-tightening torque wrench or the like with respect to the material to be fastened after the fastening. Note that this is not a method of performing the measurement by loosening a nut or a bolt. Generally, this maximum tightening torque is described in a catalog of each manufacturer.

Effect

As described above, in the embodiment, the impact tool 1 includes the motor 6, the motor housing portion 21 that houses the motor 6, the grip portion 22 that extends downward from the motor housing portion 21, the hammer 47 that is rotated by the motor 6, the anvil 10 that is impacted by the hammer 47 in a rotation direction, the hammer housing portion 3 that houses the hammer 47, the prop portion 24 that is arranged on the front side of the grip portion 22 and extends below the motor housing portion 21 or the hammer housing portion 3, the battery holding portion 23 which is connected to the grip portion 22 and the prop portion 24 and to which the battery pack 80 is detachably attached, and the light emitter unit 16 that is held at the front portion of the hammer housing portion 3 and has the plurality of light emitters 52 arranged in the rotation direction around the anvil 10. The lead wire 60 electrically connected to the light emitter unit 16 passes through the inside of the prop portion 24.

In the above configuration, in the impact tool 1 having the prop portion 24, the light emitter unit 16 having the plurality of light emitters 52 arranged in the rotation direction around the anvil 10 is held at the front portion of the hammer housing portion 3. Thus, it is possible to appropriately illuminate the periphery of the anvil 10. Furthermore, since the prop portion 24 is used as the path of the lead wire 60, it is not necessary to increase the size of the structure of the impact tool 1 in order to allow the lead wire 60 to pass. Thus, the increase in size of the impact tool 1 due to the wiring for illumination is prevented. Since the lead wire 60 is arranged in the prop portion 24 that is a support structure, assembly work of arranging the lead wire 60 is facilitated as compared with a case where the lead wire 60 is arranged in a space where a large number of parts are densely arranged. Thus, a decrease in the assembly work is prevented.

In the embodiment, the hammer housing portion 3 has the front surface portion 3C provided with the light emitter unit 16. The prop portion 24 is provided to extend downward from the front surface portion 3C of the hammer housing portion 3.

In the above configuration, the light emitter unit 16 and the prop portion 24 can be brought close to each other. Since a portion to guide the lead wire 60 is made small or the portion to guide the lead wire 60 does not need to be provided between the light emitter unit 16 and the prop portion 24, it is possible to prevent an increase in size of the impact tool 1 due to the wiring for illumination. In addition, even in a case where the hammer housing portion 3 becomes large in the large impact tool 1, impact resistance can be effectively improved by an arrangement of the prop portion 24 below the front surface portion 3C of the hammer housing portion 3.

In the embodiment, the hammer housing portion 3 has the wall portion 3F surrounding the outer periphery of the light emitter unit 16.

In the above configuration, the light emitter unit 16 can be protected by the wall portion 3F from collision from the outside.

In the embodiment, the wall portion 3F extends to the same position as the front surface of the light emitter unit 16 or ahead of the front surface of the light emitter unit 16.

In the above configuration, since the light emitter unit 16 does not protrude ahead of the wall portion 3F, the light emitter unit 16 can be effectively protected.

In the embodiment, the light emitter unit 16 is formed in the circumferential shape to surround the anvil 10.

In the above configuration, the light can be emitted from a wide range around the anvil 10 by the light emitter unit 16. It is possible to effectively illuminate a tip tool mounted on the anvil 10 and the working position.

In the embodiment, the hammer housing portion 3 includes the front tubular portion 3B in which the anvil bearing 46 that supports the anvil 10 in the rotation direction is arranged. At least a part of the light emitter unit 16 is arranged between the outer peripheral surface 3E of the hammer housing portion 3 and the front tubular portion 3B.

In the above configuration, the space between the outer peripheral surface 3E of the hammer housing portion 3 and the front tubular portion 3B can be used as the installation space of the light emitter unit 16. Thus, the increase in size of the impact tool 1 is prevented.

In the embodiment, the prop portion 24 is arranged directly below the light emitter unit 16. The light emitter unit 16 has the protrusion portion 55D that enters the inside of the prop portion 24.

In the above configuration, since the protrusion portion 55D of the light emitter unit 16 is arranged inside the prop portion 24, the lead wire 60 extending from the light emitter unit 16 can directly enter the inside of the prop portion 24. Since it is not necessary to provide a member to perform guiding between the light emitter unit 16 and the prop portion 24, the increase in size of the impact tool 1 is prevented.

In the embodiment, the battery holding portion 23 includes the controller 17 that controls the light emitter unit 16. The lead wire 60 passes from the upper end portion to the lower end portion of the prop portion 24 and is connected to the controller 17.

In the above configuration, even in a case where the light emitter unit 16 is arranged in the hammer housing portion 3, it is possible to simplify the structure for the wiring and to reduce the number of parts by using the entire prop portion 24 as the path of the lead wire 60.

In the embodiment, the light emitter unit 16 includes the optical member 55 that is arranged to cover the front side of the plurality of light emitters 52 and that diffuses the light emitted from the plurality of light emitters 52. The optical member 55 is continuous across the plurality of light emitters 52.

In the above configuration, the light emitter unit 16 can be made to emit light not in a dotted shape but in a planar shape by the optical member 55. Since a variation in brightness in the light emission direction is reduced, illumination around the anvil 10 can be more appropriately performed.

In the embodiment, the impact tool 1 includes the connection portion 25 that connects the upper end of the grip portion 22 and the upper end of the prop portion 24. The annular handle portion 11 is constituted by the grip portion 22, the prop portion 24, the battery holding portion 23, and the connection portion 25.

In the above configuration, since the grip portion 22, the prop portion 24, the battery holding portion 23, and the connection portion 25 are mutually supported by the annular handle portion 11, the impact resistance of the handle portion 11 can be effectively improved.

In the embodiment, the impact tool 1 includes the motor 6, the motor housing portion 21 that houses the motor 6, the grip portion 22 that extends downward from the motor housing portion 21, the hammer 47 that is rotated by the motor 6, the anvil 10 that is impacted by the hammer 47 in the rotation direction, the hammer housing portion 3 that houses the hammer 47, the prop portion 24 that is arranged on the front side of the grip portion 22 and extends below the motor housing portion 21 or the hammer housing portion 3, the battery holding portion 23 which is connected to the grip portion 22 and the prop portion 24 and to which the battery pack 80 is detachably attached, the side handle 90 that is detachably attached to the hammer housing portion, and the light emitter unit 16 that is arranged on the front side of the side handle 90.

In the above configuration, since the side handle 90 detachably attached to the hammer housing portion 3 that houses the hammer 47, the side handle 90 can be brought close to the heavy parts (hammer 47 and hammer housing portion 3). Thus, good balance can be secured in the impact tool 1 having the side handle 90. Since the light emitter unit 16 is arranged on the front side of the side handle 90, even in a case where the side handle 90 is mounted on the hammer housing portion 3, light from the light emitter unit 16 can be delivered to the periphery of the anvil 10 without being blocked by the side handle 90. Thus, it is possible to appropriately illuminate the periphery of the anvil 10.

In the embodiment, the hammer housing portion 3 has the annular and recessed installation portion 3D that houses the light emitter unit 16.

In the above configuration, the annular light emitter unit 16 can be compactly installed in the hammer housing portion 3. Thus, the increase in size of the impact tool 1 can be prevented.

In the embodiment, the impact tool 1 includes the buffer member 57 arranged between the hammer housing portion 3 and the light emitter unit 16. The buffer member 57 covers the rear surface of the light emitter unit 16 and at least one of the inner peripheral surface of the light emitter unit 16 or the outer peripheral surface 3E.

In the above configuration, even in a case where the light emitter unit 16 is installed in the hammer housing portion 3 that vibrates due to impact when the impact tool 1 is used, the light emitter unit 16 can be effectively protected from vibration by the buffer member 57.

In the embodiment, the light emitter unit 16 is held in the hammer housing portion 3 via the buffer member 57 in the installation portion 3D in a state of not being in contact with the hammer housing portion 3.

In the above configuration, since the light emitter unit 16 is not in contact with the hammer housing portion 3 directly, it is possible to prevent generation of the wear or the like of the light emitter unit 16 due to the vibration of the hammer housing portion 3.

In the embodiment, the hammer housing portion 3 has the wall portion 3F defining the outer periphery of the installation portion 3D. The wall portion 3F has the slit 3G that connects the light emitter unit 16 and the inside of the prop portion 24 and that allows the lead wire 60 to pass therethrough.

In the above configuration, the light emitter unit 16 can be protected by the wall portion 3F from collision from the outside. The slit 3G of the wall portion 3F allows the lead wire 60 to easily enter the inside of the prop portion 24 from the light emitter unit 16.

In the embodiment, the impact tool 1 includes the guide portion GD that guides the lead wire 60 to pass through the slit 3G without contacting the hammer housing portion 3.

In the above configuration, the lead wire 60 can be protected by the guide portion GD from the vibration generated in the hammer housing portion 3.

In the embodiment, the impact tool 1 further includes the buffer member 57 arranged between the hammer housing portion 3 and the light emitter unit 16. The light emitter unit 16 includes the protrusion portion 55D that enters the inside of the prop portion 24 through the slit 3G. The guide portion GD is defined by the passage portion surrounded by the buffer member 57 and the protrusion portion 55D inside the slit 3G.

In the above configuration, the light emitter unit 16 can be effectively protected by the buffer member 57 from the vibration. The guide portion GD can be configured by utilization of a part (protrusion portion 55D) of the light emitter unit 16 and the buffer member 57. Thus, the number of parts can be reduced as compared with a case where the guide portion GD is provided separately from the buffer member 57.

In the embodiment, the impact tool 1 includes the annular first protective cover 61 configured to cover: the wall portion 3F including the slit 3G; the end portion of the prop portion 24, the end portion being adjacent to the slit 3G; and the outer peripheral portion of the front surface 16A of the light emitter unit 16.

In the above configuration, the first protective cover 61 can reduce the impact at the time of collision with the external object of when the impact tool 1 is used.

In the embodiment, the hammer housing portion 3 includes the front tubular portion 3B that forms the inner peripheral surface of the installation portion 3D and that surrounds the anvil 10. The impact tool 1 includes an annular second protective cover 62 configured to cover the front tubular portion 3B and the inner peripheral portion of the front surface 16A of the light emitter unit 16.

In the above configuration, the second protective cover 62 can reduce impact at the time of collision with an external object of when the impact tool 1 is used. By covering the outer peripheral portion and the inner peripheral portion of the front surface 16A of the light emitter unit 16 with the first protective cover 61 and the second protective cover 62, it is possible to effectively protect the light emitter unit while securing the light emission region of the light emitter unit 16.

In the embodiment, the impact tool 1 includes the motor 6, the motor housing portion 21 that houses the motor 6, the hammer 47 rotated by the motor 6, the anvil 10 impacted by the hammer 47 in a rotation direction, the hammer housing portion 3 that houses the hammer 47, the annular light emitter unit 16 that is arranged at a front portion of the hammer housing portion 3 and surrounds the anvil 10, and the annular handle portion 11 that is arranged below the motor housing portion 21 and the hammer housing portion 3.

In the above configuration, a part of the annular handle portion 11 can function as the grip portion 22, and the other part can function as the prop portion 24. Since the annular light emitter unit 16 surrounding the anvil 10 is arranged at the front portion of the hammer housing portion 3, the periphery of the anvil 10 can be appropriately illuminated. As a result, it is possible to appropriately illuminate the periphery of the anvil 10 in the impact tool 1 having the prop portion 24.

OTHER EMBODIMENTS

In the above-described embodiment, the installation portion 3D may not be annular. Alternatively, a plurality of the installation portions 3D may be provided at intervals around the anvil shaft portion 10C. A chip-shaped light emitter and an optical member may be arranged in each of the plurality of installation portions 3D.

In the above-described embodiment, the light emitter unit 16 includes the COB light 50. The light emitter unit 16 may have a light other than the COB light. The light emitter unit 16 only needs to include a plurality of light emitters.

In the embodiment described above, the impact tool 1 is an impact wrench. The impact tool 1 may be an impact driver. In this case, the impact tool 1 includes the anvil 10 in which a mounting hole for mounting a driver bit as a tip tool is formed.

In the above-described embodiment, the power source of the impact tool 1 may not be the battery pack 80, and may be mains electricity (AC power source).

According to the techniques disclosed in the present specification, it is possible to appropriately illuminate the periphery of the anvil.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An impact tool comprising:
- a motor;
- a motor housing portion that houses the motor;
- a grip portion extending downward from the motor housing portion;
- a hammer rotated by the motor;
- an anvil that is impacted by the hammer in a rotation direction;
- a hammer housing portion that houses the hammer;
- a prop portion arranged on a front side of the grip portion and extending below the motor housing portion or the hammer housing portion;
- a battery holding portion which is connected to the grip portion and the prop portion and to which a battery pack is detachably attached; and
- a light emitter unit that is held at a front portion of the hammer housing portion and includes a plurality of light emitters arranged in the rotation direction around the anvil, wherein
  - a lead wire electrically connected to the light emitter unit passes through an inside of the prop portion,
  - the prop portion is arranged directly below the light emitter unit, and the light emitter unit includes a protrusion portion that enters the inside of the prop portion.

2. The impact tool according to claim 1, wherein
the hammer housing portion has a front surface portion provided with the light emitter unit, and
the prop portion is provided to extend downward from the front surface portion of the hammer housing portion.

3. The impact tool according to claim 1, wherein
the hammer housing portion has a wall portion surrounding an outer periphery of the light emitter unit.

4. The impact tool according to claim 3, wherein
the wall portion extends to a same position as a front surface of the light emitter unit or ahead of the front surface of the light emitter unit.

5. The impact tool according to claim 1, wherein
the light emitter unit is formed in a circumferential shape to surround the anvil.

6. The impact tool according to claim 5, wherein
the hammer housing portion includes a front tubular portion in which an anvil bearing that supports the anvil in the rotation direction is arranged, and
at least a part of the light emitter unit is arranged between an outer peripheral surface of the hammer housing portion and the front tubular portion.

7. The impact tool according to claim 1, wherein
the battery holding portion includes a controller that controls the light emitter unit, and
the lead wire passes from an upper end portion to a lower end portion of the prop portion and is connected to the controller.

8. The impact tool according to claim 1, wherein
the light emitter unit includes an optical member that is arranged to cover a front side of the light emitters and that diffuses light emitted from the light emitters, and
the optical member is continuous across the light emitters.

9. The impact tool according to claim 1, further comprising
a connection portion that connects an upper end of the grip portion and an upper end of the prop portion, wherein
the grip portion, the prop portion, the battery holding portion, and the connection portion constitute an annular handle portion.

10. An impact tool comprising:
a motor;
a motor housing portion that houses the motor;
a grip portion extending downward from the motor housing portion;
a hammer rotated by the motor;
an anvil that is impacted by the hammer in a rotation direction;
a hammer housing portion that houses the hammer;
a prop portion arranged on a front side of the grip portion and extending below the motor housing portion or the hammer housing portion;
a battery holding portion which is connected to the grip portion and the prop portion and to which a battery pack is detachably attached;
a side handle that is detachably attached to the hammer housing portion; and
a light emitter unit arranged on a front side of the side handle, wherein
the hammer housing portion includes:
an annular and recessed installation portion that houses the light emitter unit, and
a wall portion defining an outer periphery of the installation portion, and
the wall portion has a slit that connects the light emitter unit and an inside of the prop portion and that allows a lead wire to pass therethrough.

11. The impact tool according to claim 10, further comprising
a buffer member arranged between the hammer housing portion and the light emitter unit, wherein
the buffer member covers a rear surface of the light emitter unit and at least one of an inner peripheral surface or an outer peripheral surface of the light emitter unit.

12. The impact tool according to claim 11, wherein
the light emitter unit is held in the hammer housing portion via the buffer member in the installation portion in a state of not being in contact with the hammer housing portion.

13. The impact tool according to claim 10, further comprising
a guide portion that guides the lead wire to pass through the slit without contacting the hammer housing portion.

14. The impact tool according to claim 13, further comprising
a buffer member arranged between the hammer housing portion and the light emitter unit, wherein
the light emitter unit includes a protrusion portion that enters the inside of the prop portion through the slit, and
the guide portion is defined by a passage portion surrounded by the buffer member and the protrusion portion inside the slit.

15. The impact tool according to claim 10, further comprising
an annular first protective cover configured to cover
the wall portion including the slit,
an end portion of the prop portion, the end portion being adjacent to the slit, and
an outer peripheral portion of a front surface of the light emitter unit.

16. The impact tool according to claim 15, wherein
the hammer housing portion includes a front tubular portion that forms an inner peripheral surface of the installation portion and that surrounds the anvil, and
the impact tool further comprises
an annular second protective cover configured to cover the front tubular portion and an inner peripheral portion of the front surface of the light emitter unit.

17. An impact tool comprising:
a motor;
a motor housing portion that houses the motor;
a hammer rotated by the motor;
an anvil that is impacted by the hammer in a rotation direction;
a hammer housing portion that houses the hammer;
an annular light emitter unit arranged at a front portion of the hammer housing portion and surrounding the anvil; and
an annular handle portion including a grip extending downward from the motor housing portion and a prop portion arranged on a front side of the grip portion and extending below the motor housing portion or the hammer housing portion, wherein
the hammer housing portion includes:
an annular and recessed installation portion that houses the light emitter unit; and
a wall portion defining an outer periphery of the installation portion, and the wall portion has a slit that connects the light emitter unit and an inside of the prop portion and that allows a lead wire to pass therethrough.

18. The impact tool according to claim 17, wherein the prop portion is arranged directly below the light emitter unit, and the light emitter unit includes a protrusion portion that enters the inside of the prop portion.

* * * * *